United States Patent [19]

Walsh et al.

[11] Patent Number: 5,655,015
[45] Date of Patent: *Aug. 5, 1997

[54] COMPUTER-TELEPHONE INTEGRATION SYSTEM

[75] Inventors: Maryann P. Walsh, Chelmsford; Paul M. Gasparro, Sudbury, both of Mass.

[73] Assignee: Aurora Systems, Inc., Acton, Mass.

[*] Notice: The term of this patent shall not extend beyond the expiration date of Pat. No. 5,637,917.

[21] Appl. No.: 641,568

[22] Filed: May 1, 1996

Related U.S. Application Data

[62] Division of Ser. No. 198,897, Feb. 18, 1994, abandoned.

[51] Int. Cl.⁶ .................................................. H04M 3/42
[52] U.S. Cl. ........................ 379/201; 379/142; 379/157
[58] Field of Search .................................. 379/201, 202, 379/203, 204, 205, 206, 207, 96, 211, 265, 266, 88, 67, 127, 142, 157, 242, 610, 681, 682

[56] References Cited

U.S. PATENT DOCUMENTS

| | | | |
|---|---|---|---|
| 4,878,240 | 10/1989 | Lin et al. | 379/67 |
| 5,008,930 | 4/1991 | Gawrys et al. | 379/96 |
| 5,012,512 | 4/1991 | Basso et al. | 379/265 |
| 5,038,374 | 8/1991 | Kaufman et al. | 379/98 |
| 5,097,528 | 3/1992 | Gursahaney et al. | 379/201 |
| 5,101,425 | 3/1992 | Darland et al. | 379/265 |
| 5,181,239 | 1/1993 | Jolissaint | 379/265 |
| 5,200,993 | 4/1993 | Wheeler et al. | 379/96 |
| 5,210,789 | 5/1993 | Jeffus et al. | 379/127 |
| 5,241,588 | 8/1993 | Babson, III et al. | 379/127 |
| 5,299,260 | 3/1994 | Shaio | 379/265 |
| 5,329,578 | 7/1994 | Brennan et al. | 379/201 |

*Primary Examiner*—Krista M. Zele
*Assistant Examiner*—Scott Wolinsky
*Attorney, Agent, or Firm*—Wolf, Greenfield & Sacks, P.C.

[57] ABSTRACT

A computer telephone integration system includes a computer integrated with a telephone system. The computer has a plurality of independent application programs that are operable thereon and a plurality of files containing data that are retrievable by any of the plurality of independent application programs. The computer also includes a plurality of first commands that are disposed on the computer to retrieve and run any of the plurality of independent application programs and a plurality of second commands to access any of the files containing the data with any of the plurality of independent application programs. The computer further includes a call processor disposed on the computer that allows a user of the system to associate the first commands and at least one of the second commands with call information received from the telephone system at the reception of an incoming call or with call information provided by a user of the system at the initiation of an outgoing call. The call processor automatically executes the first commands and the second command upon receipt of the call information to retrieve and to run the application program and to access the file containing the data with the application program at the reception of an incoming call or at the initiation of an outgoing call.

25 Claims, 30 Drawing Sheets

CALLING NUMBER LIST

| DESCRIPTION | NUMBER |
|---|---|
| ABC COMPANY | 603-555-1234 |
| BESTCO. INC | 617-123-5656 |
| XYZ COMPANY | 508-123-5000 |

✓ OK
✗ CANCEL
? HELP
ADD
DELETE

FIG. 3

TELEPHONE PARAMETERS

SYSTEM TYPE:
☒ 75/61/63      ☐ 85/62

| EXTENSION OF CONNECTED PHONE: | x0 |
| MASTER REDIRECT NUMBER: | x0 |
| NUMBER OF LINE APPEARANCES: | 1 |
| ID/NAME START POSITION: | 0 |
| CALLER INPUT BUTTON: | 0 |
| CALLER INPUT STARTING POSITION: | 0 |
| CALLER INPUT LENGTH: | 0 |

✓ OK
✗ CANCEL
? HELP

INCOMING CALL RULES

PRIORITY: 1    ☒ ENABLED

DESCRIPTION: LOTUS 123 INCOMING ← *THIS CALL RULE DETERMINES THAT THE INCOMING CALL*

CRITERIA:
- ⦿ ALL
- ○ ANY

← *MUST MEET ALL CRITERIA, INCLUDING:*

- ☒ TIME OF DAY
- ☐ CALLING NUMBERS
- ☒ CALLED NUMBERS
- ☐ CALLER INPUT

HOUR    MINUTE

FROM: 07 ⇩   00 ⇩   AM ⇩

TO:     06 ⇩   00 ⇩   PM ⇩

← *TIME OF DAY CRITERION (FROM 7:00 AM TO 6:00 PM) AND*

CALLING NUMBER SELECTIONS:

CALLED NUMBER SELECTIONS:
- CUSTOMER SERVICE
- EMPLOYEE HOTLINE
- PERSONAL LINE
- SUPPORT

← *CALLED NUMBERS CRITERION (CUSTOMER SERVICE AND SUPPORT)*

CALLER INPUT SELECTIONS:

ACTION DESIRED: ACCEPT CALL ⇩ ← *FOR THE ACTION OF ACCEPT CALL TO OCCUR.*

Buttons: ✓ OK   ✗ CANCEL   ? HELP   ADD   DELETE   NEXT   PREV   FIRST   LAST   ALERTS

150

INCOMING CALL RULES

PRIORITY: 2

DESCRIPTION: ACCOUNTS PAYABLE RULE 1

CRITERIA:
○ ALL
● ANY

☒ TIME OF DAY
☒ CALLING NUMBERS
☐ CALLED NUMBERS
☒ CALLER INPUT

FROM: HOUR 07 ⇩  MINUTE 00 ⇩  AM ⇩
TO:   HOUR 06 ⇩  MINUTE 00 ⇩  PM ⇩

☐ ENABLED

CALLING NUMBER SELECTIONS:
ABX COMPANY
ATTENDANT
HOOSAMATHINGY'S, INC.
INTERNATIONAL WIDGETS
JANE SMITH
MIS

CALLED NUMBER SELECTIONS:

CALLER INPUT SELECTIONS:
ACCOUNTING
ACCOUNTS PAYABLE
ACCOUNTS RECEIVABLE
CUSTOMER SERVICE
PRODUCTION
SALES

ACTION DESIRED: FORWARD TO VOICE MAIL ⇩

✓ OK
✗ CANCEL
? HELP
ADD
DELETE
NEXT
PREV
FIRST
LAST
ALERTS

| HANGUP REQUESTED 5 | HOLD 6 | HOLD REQUESTED 7 | TRANSFER COMPLETE PENDING 8 | TRANSFER REQUESTED 9 | CONFERENCE COMPLETE PENDING 10 | CONFERENCE REQUESTED 11 |
|---|---|---|---|---|---|---|
| S = 2 | S = 2 | S = 2 | S = 2 | S = 2 | S = 2 | S = 2 |
| S = 4 | S = 4 | S = 4 | S = 4 | S = 4 | S = 4 | S = 4 |
| S = 1 | S = 1 | S = 1 | S = 1 | S = 1 | S = 1 | S = 1 |

FIG. 22B

| HANGUP REQUESTED 5 | HOLD 6 | HOLD REQUESTED 7 | TRANSFER COMPLETE PENDING 8 | TRANSFER REQUESTED 9 | CONFERENCE COMPLETE PENDING 10 | CONFERENCE REQUESTED 11 |
|---|---|---|---|---|---|---|
| S = 5 | S = 6 | S = 7 | S = 8 | S = 9 | S = 10 | S = 11 |
| S = 5 | S = 6 | S = 7 | S = 4 | S = 4 | S = 4 | S = 4 |
| S = 1 | S = 6 | S = 7 | S = 8 | S = 9 | S = 10 | S = 11 |
| S = 2 | S = 2 | S = 2 | S = 2 | S = 2 | S = 2 | S = 2 |

FIG. 23B

| HANGUP REQUESTED 5 | HOLD 6 | HOLD REQUESTED 7 | TRANSFER COMPLETE PENDING 8 | TRANSFER REQUESTED 9 | CONFERENCE COMPLETE PENDING 10 | CONFERENCE REQUESTED 11 |
|---|---|---|---|---|---|---|
| A= REQUEST ANSWER  S=3 | A= REQUEST ANSWER  S=3 | A=  S=7 | A= REQUEST ANSWER  S=3 | A= REQUEST ANSWER  S=3 | A= REQUEST ANSWER  S=3 | A= REQUEST ANSWER  S=3 |
| A=  S=5 | A=  S=6 | A=  S=7 | A= REQUEST TRANSFER COMPLETE  S=5 | A=  S=9 | A=  S=10 | A=  S=11 |
| A=  S=5 | A=  S=6 | A=  S=7 | A= REQUEST TRANSFER COMPLETE  S=5 | A=  S=9 | A=  S=10 | A=  S=11 |

FIG. 23D

| A= | A=REQUEST CONF'NCE COMPLETE | A= | A=REQUEST DIAL | A=REQUEST HANG UP |
|---|---|---|---|---|
| S=11 | S=10 | | S=11 | S=11 |

(Table of cells - each cell contains A= field and S= field)

Row S=11: A=(blank), A=(blank), A=(blank), A=REQUEST DIAL, A=REQUEST HANG UP
Row S=10: A=REQUEST CONF'NCE COMPLETE, A=(blank), A=(blank), A=REQUEST DIAL, A=REQUEST HANG UP
Row S=9: A=(blank), A=(blank), A=(blank), A=REQUEST DIAL, A=REQUEST HANG UP
Row S=8: A=(blank), A=(blank), A=(blank), A=REQUEST DIAL, A=REQUEST HANG UP
Row S=7/5: A=(blank) S=7, A=(blank) S=7, A=(blank) S=7, A=REQUEST DIAL S=7, A=REQUEST HANG UP S=5
Row S=6/5: A=(blank) S=6, A=(blank) S=6, A=(blank) S=6, A=REQUEST DIAL S=6, A=REQUEST HANG UP S=5
Row S=5: A=(blank), A=(blank), A=(blank), A=REQUEST DIAL, A=(blank)

COMPUTER-TELEPHONE INTEGRATION SYSTEM

This application is a FWC/continuation of application Ser. No. 08/198,897, filed Feb. 18, 1994, now abandoned.

FIELD OF INVENTION

This invention relates to a computer-telephone integration system which is application program, site, and telephone switching device independent.

BACKGROUND OF INVENTION

Computer-Telephone Integration (CTI) generally refers to a system in which a computer automatically responds to an incoming (or outgoing) telephone call. One application is in the consumer catalog business for a computer system which includes a data base of catalogue items and previous orders by customers. A computer-telephone integration system lets the customer service representative know the name of the calling customer without asking. The caller's telephone number, or a keyed in identification number, is extracted from the telephone system and fed into the computer to automatically retrieve and display data as required. Computer-telephone integration systems save time and greatly increase productivity. Such systems are used in the airline industry for handling fare and ticket queries and in many other businesses which regularly handle customer calls.

Computer-Telephone Integration is also applicable to outbound call handing. In applications such as account collections, a user of a CTI system could make many more contacts per day by the more efficient call processing that CTI affords. For example, A CTI system can automatically extract a telephone number from an application database record, and send commands to the telephone switching device that will dial the number extracted. This reduces keystroke and button push time for the user. In addition, A CTI system could command the telephone switching device to automatically dial from a list of telephone numbers (e.g. delinquent accounts) and not connect the call to a user until it has been determined that a live person has answered, eliminating calls unanswered, busy calls and calls answered by a telephone answering device.

Heretofore, however, such systems were individually configured to handle incoming or outgoing calls. That is, at any one site, technicians must install the hardware and software which allows the telephone to communicate with the database and spreadsheet programs existing on the computer system at the site. One reason for this is that individual computer application programs require the entry of unique commands to retrieve files. For example, a database program may require one set of commands to retrieve certain data while a spreadsheet application program may require quite different commands. The problem is compounded when users set up their own files and fields of data within those application programs because then the commands required to retrieve a file are unique to that user's system. Differences in operating systems are also a factor in customization.

Therefore, it is nearly impossible to design a computer telephone integration system which uniformly works with different application programs such as d-BASE, LOTUS 123, CARDFILE, etc. which all require different command sequences to retrieve files and/or data.

So, those skilled in the art of computer programming and system design would interface the user's computer to its telephone system and then write one program to access, for example, the accounts receivable data base file based on the caller's telephone number or other identification. Another program would be written to access for example, credit information spreadsheet files based on the same information.

This methodology requires knowledge of computer programming techniques and is often a large, time consuming, and expensive undertaking requiring the assistance of outside contractors.

Another consideration in computer-telephone integration systems is establishing rules for call handling. Some callers may need specialized treatment, such as a service representative who can speak a certain foreign language, or who is familiar with a specific caller's account. Some calls and some callers may always require priority handling while other calls, during a certain time period for example, could be rerouted or recorded and then handled at a later, less busy time. These priority rules are also usually individually programmed by those skilled in the art. Such priority rule programs, however, are site specific and will not work on other systems nor would they be applicable to another business.

Finally, there are many different manufacturers of telephone switching devices used in a computer-telephone integration system. Each manufacturer generally establishes unique protocols for the telephone functions to be performed on the computer such as the dial, hold, answer, conference, and transfer functions.

Again, those skilled in the art must write specific interface programs so that the commands from the computer keyboard are correctly recognized by the telephone switching device, and vice-versa.

In general then, computer telephone integration systems are generally custom designed and integrated for individual customers for use only at the customer site.

SUMMARY OF INVENTION

It is therefore an object of this invention to provide a computer telephone integration system which does not require programming skills to set up and operate.

It is a further object of this invention to provide such a computer telephone integration system which uniformly configures the computer system independent of the application program commands required to retrieve information based on incoming and outgoing calls.

It is a further object of this invention to provide such a computer-telephone integration system which allows precedential "call handling" rules to be established for retrieving application program data information based on call information and time of day.

It is a further object of this invention to provide such a computer-telephone integration system which uniformly processes incoming and outgoing telephone calls independent of the different switching device command protocols established by the telephone switch manufacturer.

It is a further object of this invention to provide such a computer-telephone integration system which, when provided to the end user, correctly interfaces with many different types of application programs, telephone switching devices, and call handling priority rule procedures.

It is a further object of this invention to provide an ergonomic computer-telephone integration system which is user friendly and does not require programming skills or knowledge of telephone switching device protocols.

This invention results from realization that if a middleware layer of software is inserted between the computer application programs and the telephone system in a computer-telephone integration system and the middleware is able to learn the commands required to access the different application programs and then dynamically reconstruct and automatically repeat these commands using call-specific information upon receipt of an incoming call or placement of an outgoing call, the need for writing application specific programs is eliminated resulting in a uniformly configured system which works with all types of application programs at many different customer sites. It was realized that since the users of the various application programs know the command strings to be entered to retrieve data, if the middleware layer was "taught" these commands once then it could repeat them later eliminating the need write specific interface programs for each installation of a computer telephone integration system.

This invention also results from the further realization that an application and site independent rule-based computer-telephone integration system is effected by a call processor which uniformly establishes precedential rules for retrieving application program information based on incoming call information thereby eliminating the need to individually program call handling rules for each application at each site. It was realized that the user can in fact specify the precedential rules and then a call processor routine can be invoked to later implant the rules eliminating the need to write specific programs for call handling.

This invention also results from the realization that an application program and a switching device-independent computer-telephone integration system is effected by establishing a library of a uniform set of telephone functions and a state machine which translates stored switch commands for many different types of switching devices into the uniform telephone functions thereby eliminating the need to individually program the computer to interface with each type of switching device. This establishes a single user interface within the middleware which allows a user to perform the telephone functions in the same manner, regardless of the application or telephone switching device environments.

This invention features and may suitably comprise, consist essentially of, or consist of an application independent computer telephone integration system including telephone means for transmitting call information; computer means, in communication with the telephone means, running a plurality of application programs having retrievable data; and middleware means, operable on the computer means, for uniformly configuring the computer means to automatically access the application programs and to retrieve data in response to call information transmitted by the telephone means.

The middleware means includes means for entering and storing the commands required to access the retrievable data based on call information transmitted by the telephone means and means for automatically invoking the stored commands upon receipt of call information transmitted by the telephone means.

The call information may include incoming call information, and/or outgoing call information. The retrievable data is arranged in one or more files and the files include telephone number data. The application programs include commands for retrieving files based on telephone number data and the middleware means includes means for entering and storing the commands required to retrieve a file based on the telephone number data.

The call information includes telephone number data and the middleware means includes means for automatically extracting the telephone number data and invoking the stored commands upon receipt of the call information to automatically retrieve a file based on the telephone number data.

The system further includes call processor means operable on the computer means including means for uniformly establishing precedential rules for retrieving application program data based on the call information and means for automatically executing the established precedential rules in response to transmitted call information. The precedential rules may include criteria which must be met before the rules are executed. Examples of criteria include a calling party's number, the called party's number, time of day information, and input keyed in and transmitted and there may be means for translating a calling party's number into a criteria code.

The system includes means for denoting rule priority, and means for evaluating rules in order of priority. The call processor means includes means for analyzing which rule criteria are met by an incoming call on the telephone means. If a rule is to accept a call received by the telephone means, the means for automatically executing includes mean for accepting the call; if a rule is to forward a call received by the telephone means, the means for automatically executing includes means for transferring the call.

Also included is an established set of telephone functions for commanding the computer means stored on the computer means; a library including a plurality of telephone switching device commands for a number of different types of switching devices; and state machine means, operable on said computer means, for translating the switching device commands into equivalent established telephone functions for uniformly processing incoming telephone calls.

The state machine means further includes means for translating the established telephone functions into equivalent switching device commands for uniformly processing outgoing telephone calls and phone interface means, in communication with a switching device, for detecting events occurring on the switching device and processing switching device dependent communications. Call processor means, in communication with the phone interface means, processes switching device independent communications in accordance with the established telephone functions. The state machine means further includes call control means in communication with the call processor means for communicating a user requests to the call processor means via switching device independent communications in accordance with the established set of telephone functions.

The invention further features a system for uniformly configuring a computer to automatically access and retrieve computer files in response to received telephone transmitted information received by the computer comprising middleware operable on the computer for interfacing the computer with telephone transmitted information including means for entering and storing the commands required to retrieve computer files based on telephone transmitted information, and means for automatically executing the stored commands upon receipt of telephone transmitted information for automatically accessing and retrieving files which correspond to an incoming telephone call.

The means for automatically executing includes means for extracting the telephone transmitted information and coupling that information with the stored commands. The telephone transmitted information includes a telephone number. Further included are call processor means operable on the computer for uniformly establishing precedential rules for retrieving computer application program data based on call information; and means for automatically invoking the established precedential rules upon receipt of call information transmitted by the telephone system. The call processor means further includes means for assigning priority among the rules and there are means means for establishing a call criteria for a rule which must be met before a rule is invoked.

Further included are means for detecting an incoming call on the telephone means and extracting the call criteria from the incoming call and means for matching the call criteria with the rules in order of priority. The system further includes an established set of telephone functions for commanding the computer stored on the computer; a library including a plurality of telephone switching device commands for a number of different types of switching devices; and state machine means, operable on the computer, for translating the switching device commands into the equivalent established telephone functions for uniformly processing incoming telephone calls. The state machine means further includes means for translating the established telephone functions into equivalent switching device commands for uniformly processing outgoing telephone calls.

This invention also features a method of establishing an application independent computer telephone integration system comprising connecting telephone means for transmitting call information with computer means for running a plurality of application programs having retrievable data; and uniformly configuring the computer mean to automatically access the application programs and to retrieve data in response to call information transmitted by the telephone means including entering and storing the commands required to access the retrievable data based on call information transmitted by the telephone means and automatically invoking the stored commands upon receipt of call information transmitted by the telephone means. The method further includes entering the retrievable data in one or more files, and entering and storing commands required to retrieve a file based on telephone number data; and transmitting call information which includes telephone number data, extracting the telephone number data, and automatically invoking the stored commands upon receipt of the call information to automatically retrieve a file based on the telephone number data.

Precedential rules are established are stored on the computer means and application program data is retrieved based on the call information. The established precedential rules are automatically executed in response to the transmitted call information.

The method further includes establishing criteria for the precedential rules which must be met before the rules are executed including denoting at least one of a calling party's number, a called party's number, and input keyed in and transmitted to said telephone means by a caller and translating a calling party's number into a criteria code. The method also includes analyzing which rule criteria are met by a an incoming call on the telephone means. A rule is established to accept a call received by the telephone means; and a rule is established to transfer a call received by said telephone means.

The method further includes storing a set of telephone functions for commanding the computer means on the computer means; establishing a library including a plurality of telephone switching device commands for a number of different types of switching devices; and translating the switching device commands into equivalent said stored telephone functions for uniformly processing incoming telephone calls independent of telephone switching device commands. The method of further includes translating the telephone functions into equivalent switching device commands for uniformly processing outgoing telephone calls.

Also featured is a method for uniformly configuring a computer for automatically accessing and retrieving computer files in response to received telephone transmitted information received by the computer comprising interfacing the computer with telephone transmitted information including entering and storing the commands required to retrieve computer files based on telephone transmitted information and automatically executing the stored commands upon receipt of telephone transmitted information for automatically accessing and retrieving files which correspond to an incoming telephone call. Automatically executing includes extracting the telephone transmitted information and coupling that information with the stored commands.

An application program, site, and switching device independent computer telephone integration system according to this invention features telephone means for transmitting call information; computer means; switching device means for interfacing the telephone means with the computer means; middleware means, operable on the computer means, for uniformly confirming the computer means to automatically access application program data on the computer means in response to call information; call processor means, operable on the computer means, for uniformly establishing precedential rules for retrieving application program data on the computer means in response to call information; and state machine means, operable on said computer, for uniformly processing call information independent of different switching device commands. The state machine includes means for receiving switching device dependent commands from the switching device means; means for converting the switching device dependent commands into switching device independent commands; and means for processing the switching device independent commands within the computer-telephone integration system for uniformly operating the computer independent of switching device dependent commands. The means for converting includes a library of telephone switching device dependent commands, and means for searching the library until a match for a received switching device dependent commands is found, and means for converting that command into a switching device independent command associated with the switching device dependent command for transmission to the means for processing.

An application program, site, and switching device independent system for a computer-telephone integration system including a telephone system for transmitting call information and a computer in communication with the telephone system through a switching device comprises middleware means, operable on the computer, for uniformly configuring the computer to automatically access application program data in response to call information; call processor means, operable on the computer, for uniformly establishing precedential rules for retrieving application program data in response to call information; and state machine means, operable on the computer, for uniformly processing call information independent of different switching device commands.

A method of establishing an application program, site, and switching device independent system for a computer-telephone integration system including a telephone system for transmitting call information and a computer in communication with the telephone system through a switching device according to this invention includes storing middleware means, operable on the computer, for uniformly configuring the computer to automatically access application program data in response to call information; establishing processor means, operable on the computer, for uniformly establishing precedential rules for retrieving application program data in response to call information; and storing state machine means, operable on the computer, for uniformly processing call information independent of different switching device commands.

Finally, this invention features a middleware system for a computer in communication with a telephone via switching device comprising means for allowing a user to enter the command strings required to access data stored on the computer in accordance with application programs running on the computer; means for storing the command strings entered and for associating the stored commands with telephone transmitted information received though the switching device; and means for automatically invoking the appropriate stored command strings upon receipt of telephone transmitted information for retrieving specific data stored on the computer that is also associated with the telephone transmitted information.

The middleware system may further include a state machine stored on the computer comprising means for converting switching device dependent commands into switching device independent commands for uniform processing of incoming telephone calls independent of switching device dependent commands, and conversely, for converting switching device independent commands into switching device dependent commands for uniform processing of outgoing telephone calls.

The middleware system may also include call processor means for establishing precedential call handling rules comprising means for allowing a user to enter call handling rules, means for storing the call handling rules and for associating the stored call handling rules with specific telephone transmitted information received though the switching device; and means for automatically invoking the stored call handling rules upon receipt of telephone transmitted information for processing telephone calls according to the precedential call handling rules.

DISCLOSURE OF PREFERRED EMBODIMENT

Other objects, features and advantages will occur to those skilled in the art from the following description of a preferred embodiment and the accompanying drawings, in which:

FIG. 3 is a view of a screen for entering telephone numbers according to the setup routine of FIG. 2;

FIG. 4 is a view of a screen for denoting the telephone parameters according to the set-up routine of FIG. 2;

FIG. 15 is a view of a screen for establishing incoming call precedential rules according to FIG. 14;

FIG. 16 is a view of a screen for entering a call forwarding rule according to FIG. 14;

FIGS. 18, 19, 19A and 19B are block diagrams of the rules-based call processing routines of the computer-telephone integration system according to this invention; and FIGS. 20–20D, 21–21D, 22–22B, and 23–23D are a block diagrams of the state machine for translating stored switching device commands into established telephone functions for uniformly processing incoming telephone calls independent of individual switching device commands of the computer-telephone integration system of this invention.

The Computer-Telephone Integration System

Figure 1:
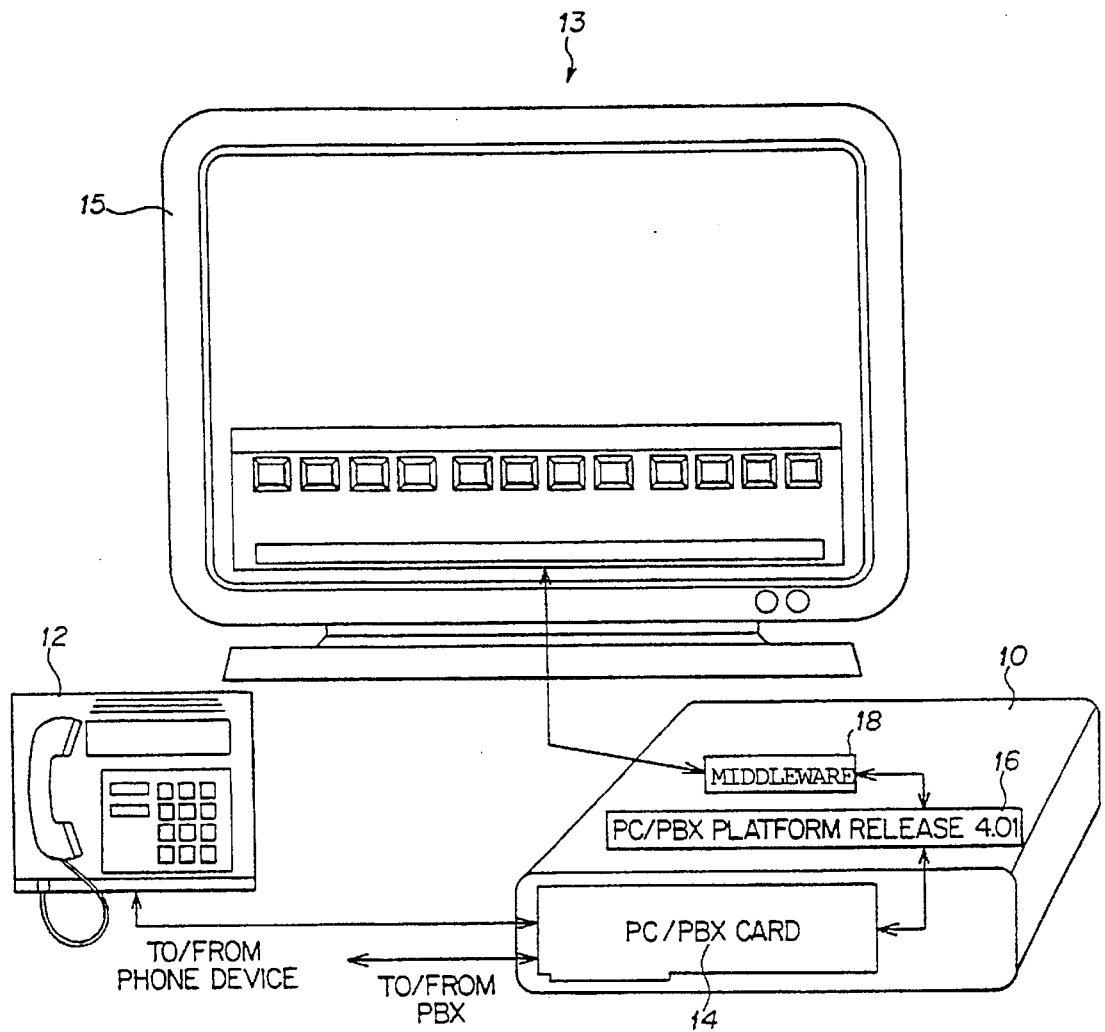
FIG. 1 is a schematic diagram of the primary hardware and software subsystems of the computer-telephone integration system of this invention.

The computer-telephone integration system 13 of this invention includes computer 10, FIG. 1, such as an IBM compatible personal computer. Connected to computer 10 is telephone system 12 such as an AT&T 7400 Series Telephone. System 13 also includes switch interface 14 such as an AT&T PC/PBX Card and switch interface drivers 16 such as PC/PBX Platform Release 4.01 for extracting call information (such as a telephone number) from an incoming call received by telephone 12 and forwarding call information to computer 10. Switch interface 14 could also be a stand alone module that plugs into a communication port of the computer. Alternatively switch interface 14 could be a local area network connection to a server which is centrally interfaced to the switch. Monitor 15 is for viewing database records, spreadsheet data and the like automatically retrieved in response to an incoming call on telephone 12.

According to this invention, middleware program layer 18 is "inserted" between computer 10 (and the application programs operating thereon) and telephone system 12 including the switching device 14 and platform 16 to uniformly configure computer 10.

Middleware program layer 18 automatically and uniformly configures computer 10 so that the commands required to retrieve files from any application program stored on computer 10 are recorded and then executed in response to an incoming call.

By way of example, if computer 10 is used in a large university, one application program may be a database of student grade data, one application program may be a database of student loan data, and one application program may be a spreadsheet including charitable contribution information. A WINDOWS type operating system provides access to the application programs running on local or remote computer hardware as is known. As discussed in the Background of Invention above, since the grade database, the student loan database, and charitable contribution spreadsheet application programs might all have different command string sequences to retrieve files and data, computer 10 would normally be individually programmed such that when a telephone call is received, one program operates to retrieve grade information, one program operates to receive student loan information, and still a third program operates to retrieve charitable contribution information. These programs, however, may not work on different computer systems which a/so may interface with different types of telephone switch devices. And, if the user of the system adds another application program, a programmer would be called in to add still another interface program.

This labor intensive prior method is eliminated according to this invention which is described in more detail below.

Figure 5:
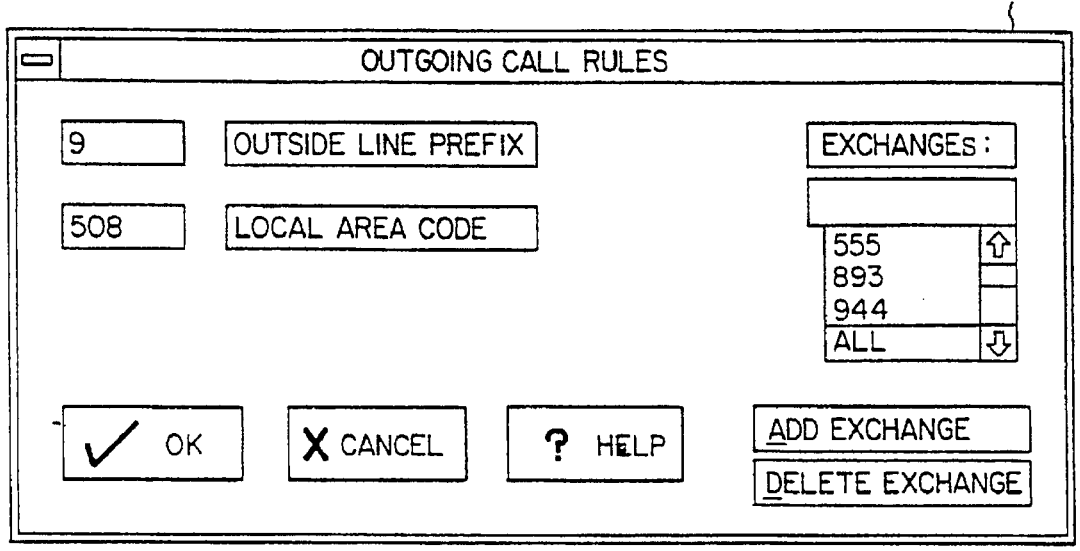
FIG. 5 is a view of a screen for entering area code information according to the set-up routine of FIG. 2.
Figure 6:
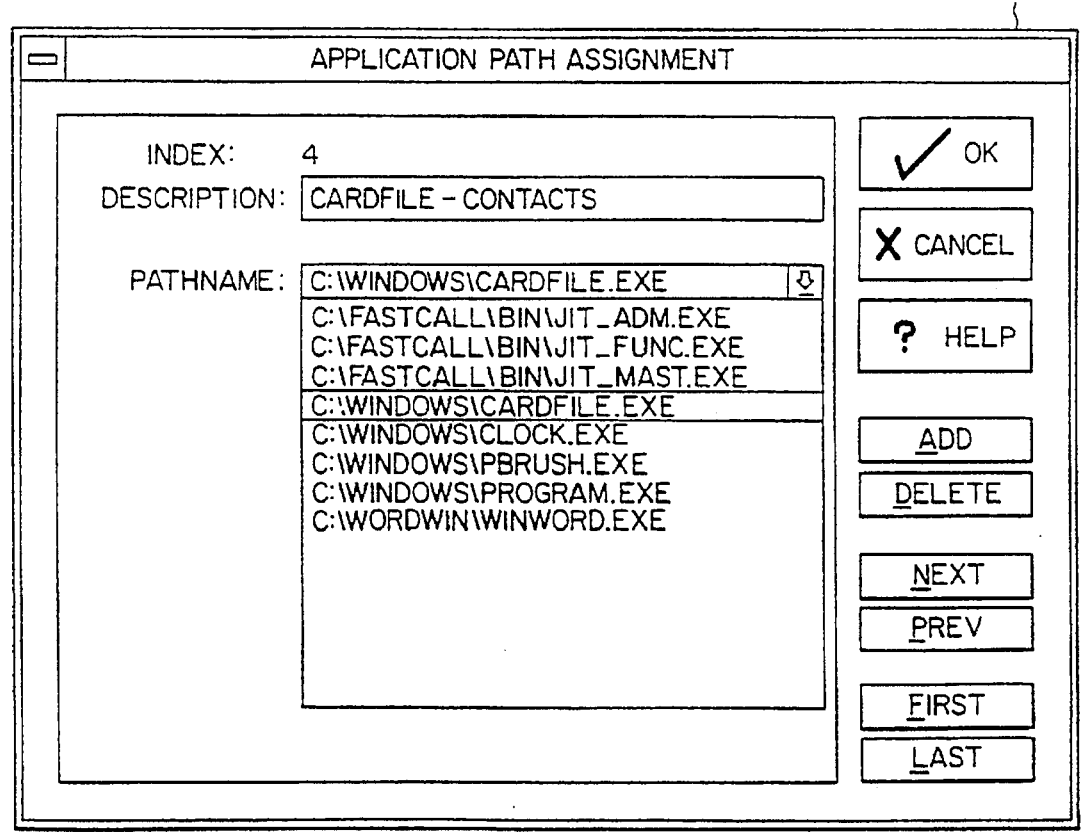
FIG. 6 is a view of a screen for entering application path assignments according to the set-up routine FIG. 2.

Uniform Configuration of the Computer-telephone System to Access Application Program Data According to this invention, middleware program 18, FIG. 1, operates on computer 10 providing uniform configuration of computer 10 to handle incoming and outgoing calls. Middleware program 18 allows the user to enter the system phone numbers and dialing parameters, steps 20 and 22, FIG. 2. FIG. 3 shows screen 21 of middleware program 18 for entering the system telephone numbers; FIG. 4 shows screen 23 for entering the system type and parameters, FIG. 5 shows screen 25 for entering area code information, and screen 27, FIG. 6 shows selection of application path assignments.

Figure 7:
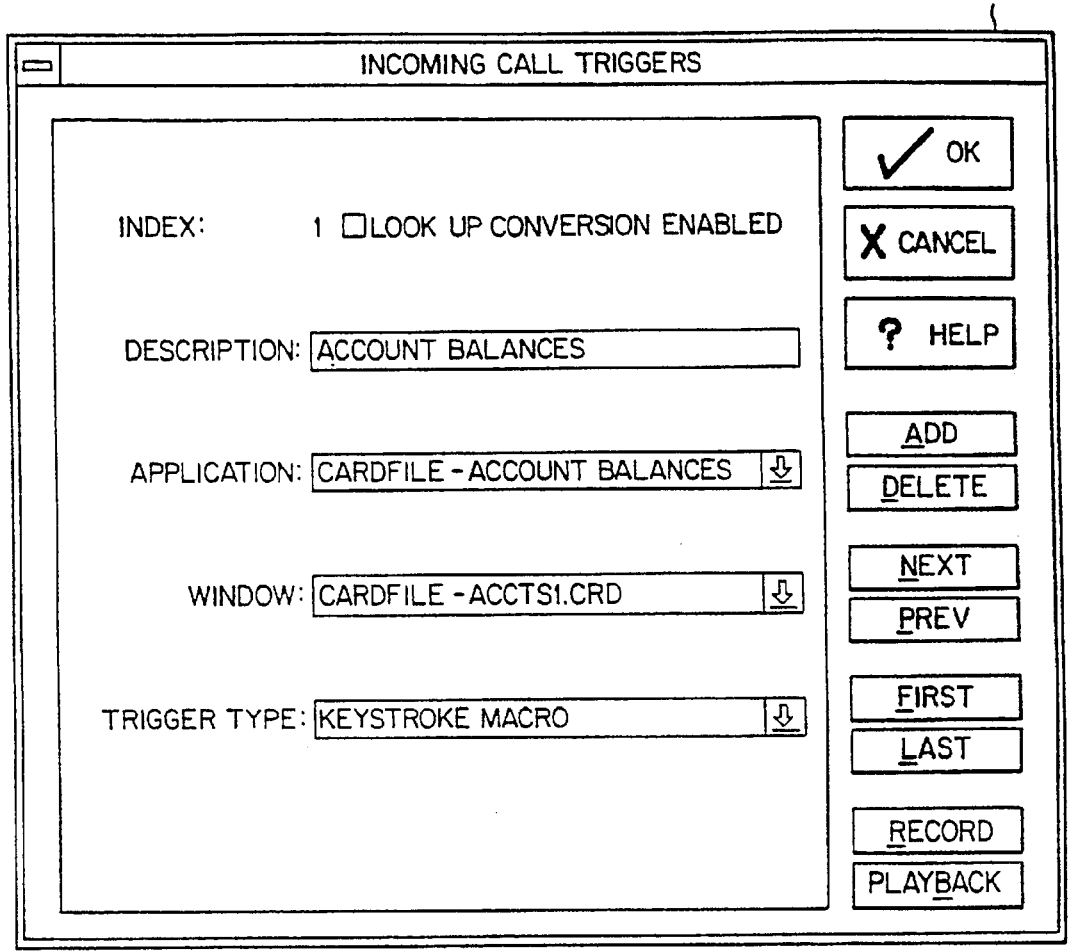
FIG. 7 is a view of a screen for entering incoming call triggers according to the set-up routine of FIG. 2.

For example the user site may have a number of telephone lines each of which receive incoming calls. Middleware program 18 then allows the user to enter the system applications, step 24, FIG. 2. The database and spreadsheet application programs discussed above are entered in screen 29, FIG. 7. Since there may be different windows for each application, the user enters the windows for each application, as shown in screen 29, FIG. 7 and screen 33, FIG. 9 for incoming and outgoing calls respectively.

Figure 8:
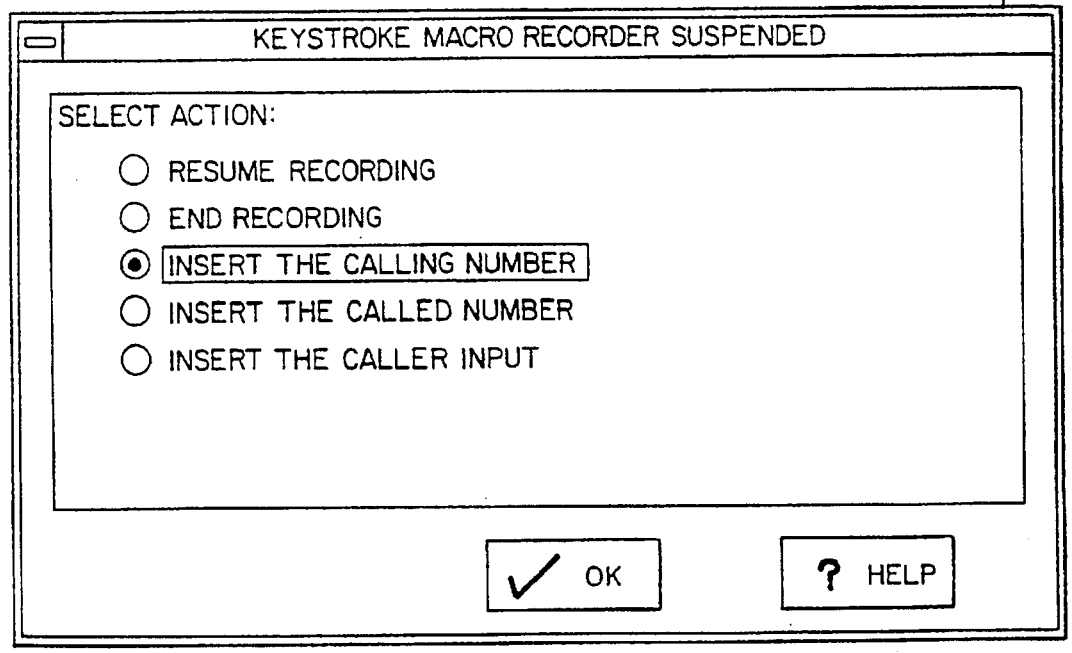
FIG. 8 is a view of a screen for entering windows for incoming calls according to the set-up routine of FIG. 2.
Figure 9:
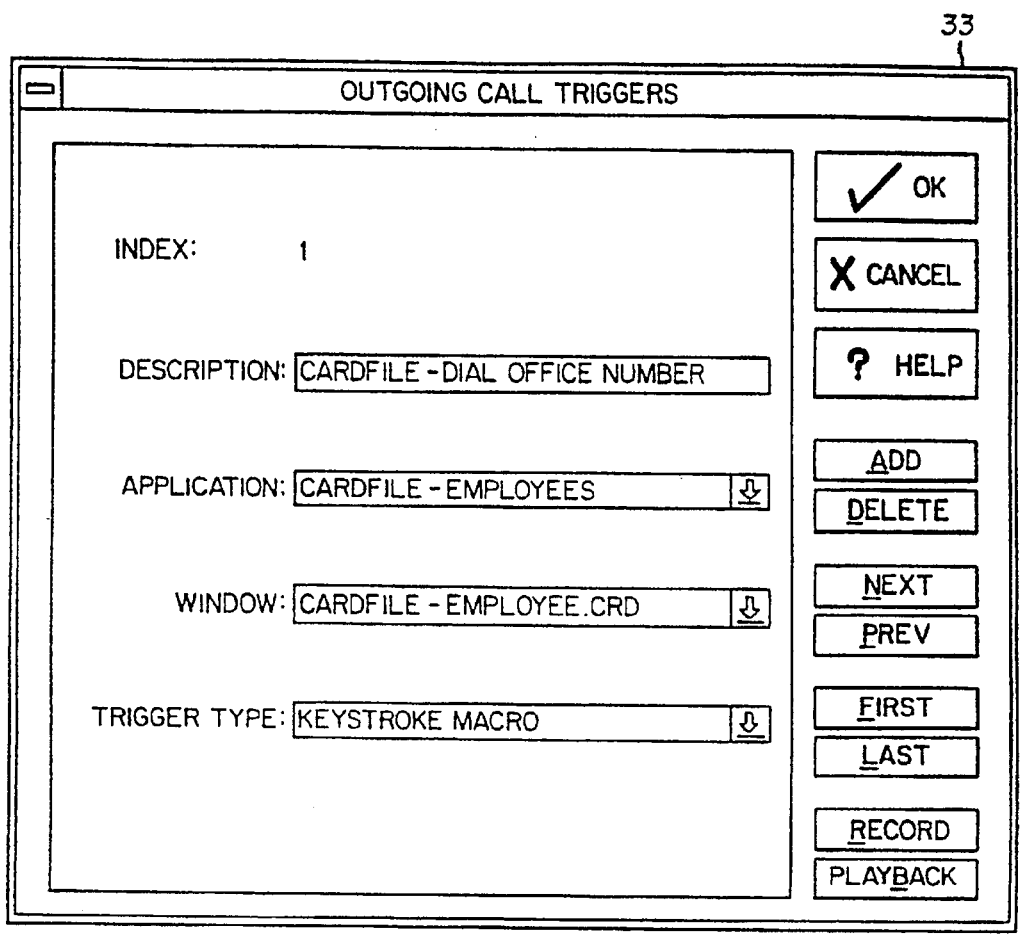
FIG. 9 is a view of a screen for creating outgoing call triggers according to the set-up routine of FIG. 2.

For each window, step 28, the user types in the commands required to retrieve a screen or record based on call information from telephone set 12, as extracted by board 14 and platform 16, FIG. 1. This command string, entered in screens 31 and 33, FIGS. 8 and 9 is then stored and referred to as a "trigger".

Figure 2:
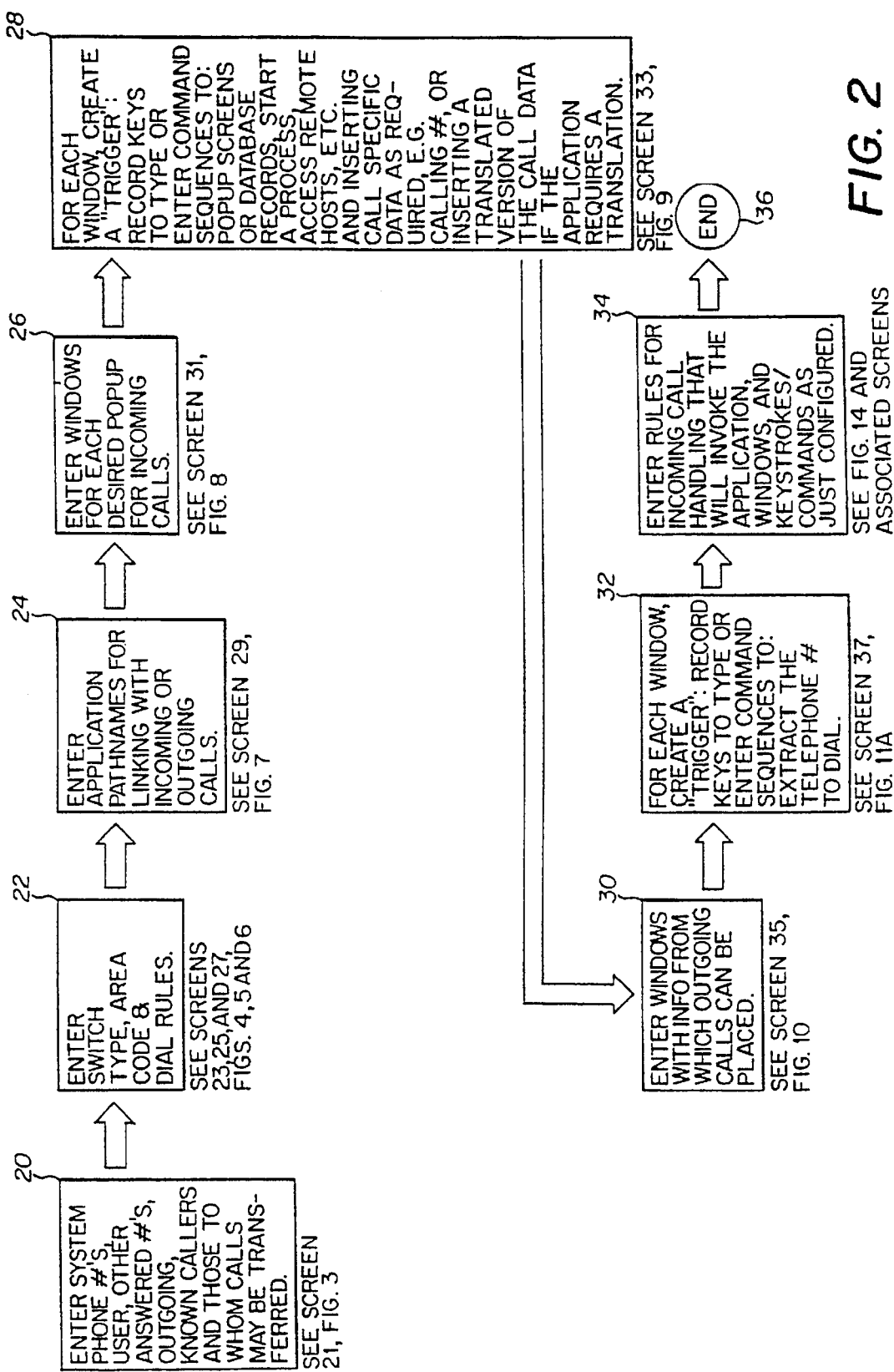
FIG. 2 is a block diagram of a set up routine for uniformly configuring the computer-telephone integration system of FIG. 1 to access different application programs according to this invention.

Returning to the previous example, the university employee enters the telephone numbers of the administrative office in step 20, FIG. 2. After establishing the switch type, area code, and dial rules, step 22, he then enters the names of the grade and financial aid database application programs and the charitable contribution spreadsheet application program, step 24. For the database program, he enters the grade window and the financial aid window and for the spreadsheet programs he enters the charitable contribution window, step 26. For each window, he enters the commands required to retrieve a screen by telephone number. There may be one command string required to retrieve the grades of a student by phone number and another command string required to retrieve the financial aid information of a student by phone number. And, there may be a different set of commands required to retrieve charitable contribution information from the spreadsheet application program based on a callers phone number.

But, having previously worked with these application programs, the user knows these commands and enters them in step 28, FIG. 2. Middleware program 18, FIG. 1, then records these commands and will automatically repeat them later upon receipt of an incoming call. Note that the system is easily configured without the need for computer programmers or individual programs created for each application.

Figure 10:
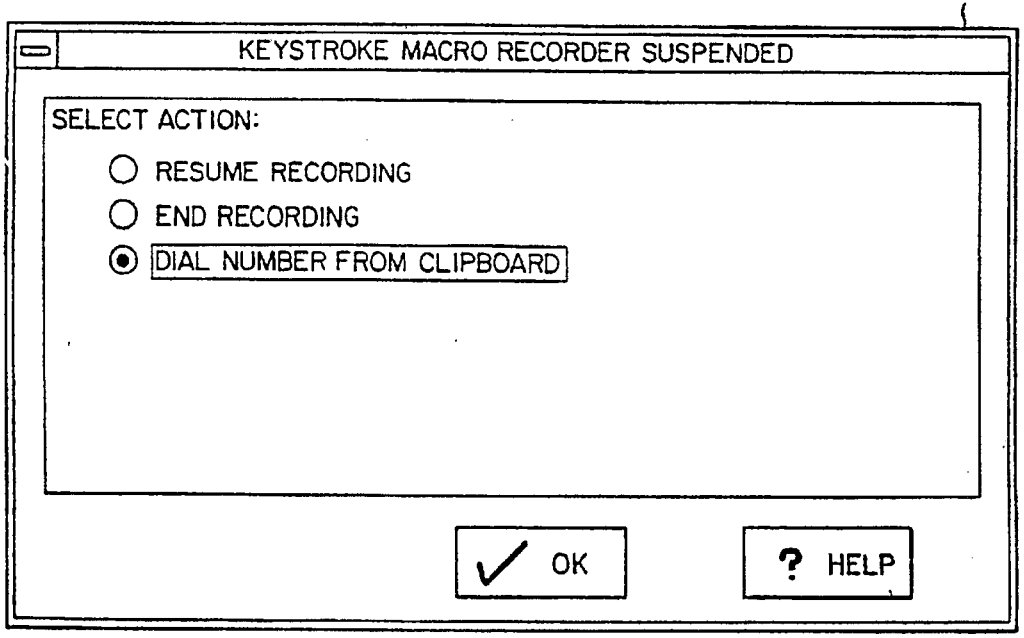
FIG. 10 is a view of a screen for entering windows for outgoing calls according to the set-up routine of FIG. 2.
Figure 11:
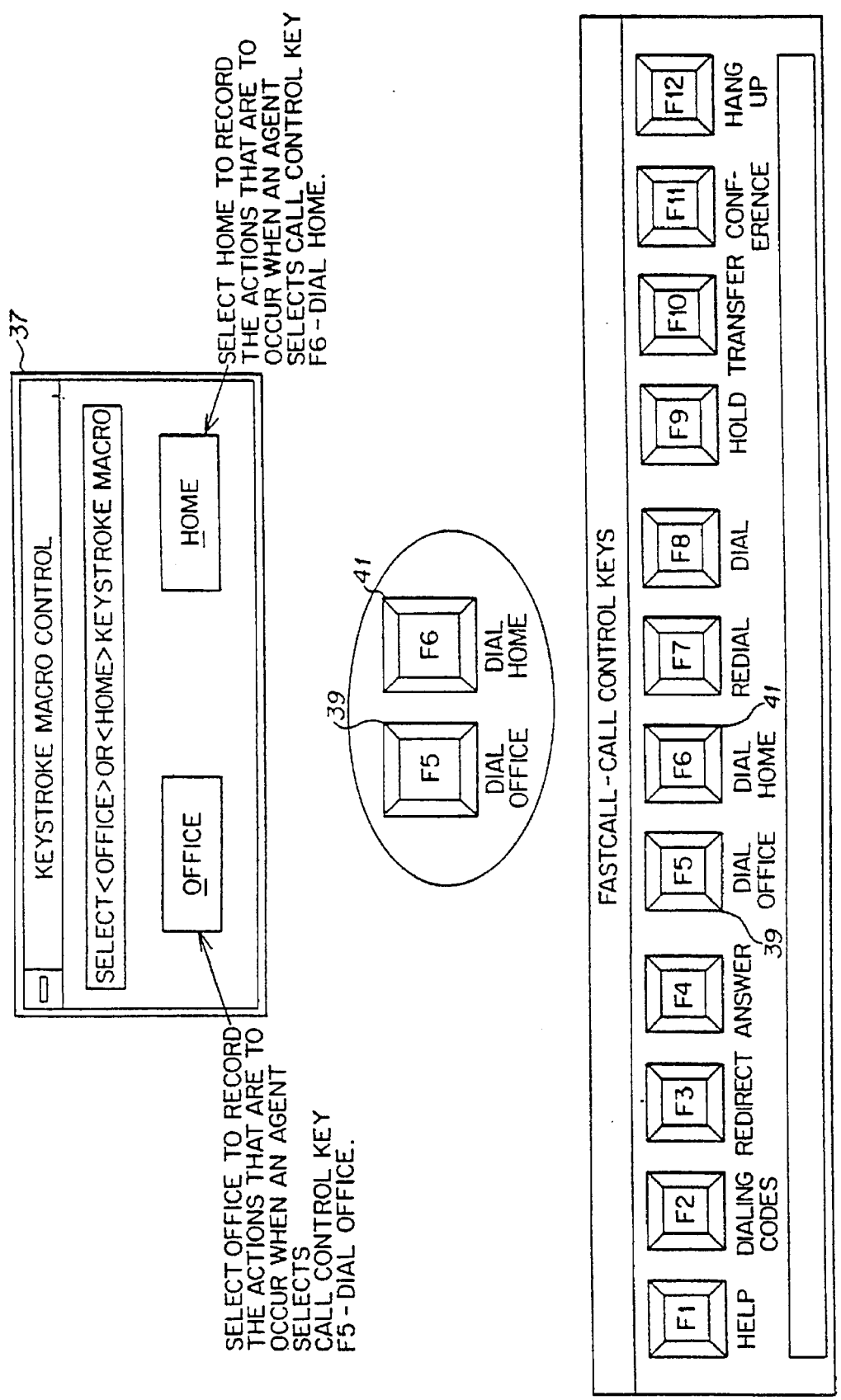
FIG. 11 is a view of a screen for extracting outbound dialing numbers including a set of control function keys for selecting outbound dialing numbers.

A similar process is performed for outgoing call automation. The windows are entered from which outgoing calls can be placed, step 30, FIG. 2. See screen 35, FIG. 10. For each window, step 32, FIG. 2, the user creates a trigger as with incoming calls and then types the commands required to extract two telephone numbers, e.g. home and office, and pass them on to the middleware layer for outbound dialing. See screen 37, FIG. 11. Rules are then entered, step 34, for incoming call handling that will invoke the application, windows and keystrokes/commands as just configured. When this is completed, the process ends, step 36, FIG. 2. Control keys 39, 41, etc., FIG. 11 assist in making these selections quickly.

This process is repeated for each application and after this set-up routine is completed, the system is uniformly configured to access all the user's application programs and retrieve data in response to call information. When a telephone call is received on telephone set 12, FIG. 1, an applicable rule may be executed as shown in the routine shown in FIG. 12.

Incoming Call Processing

Figure 12:
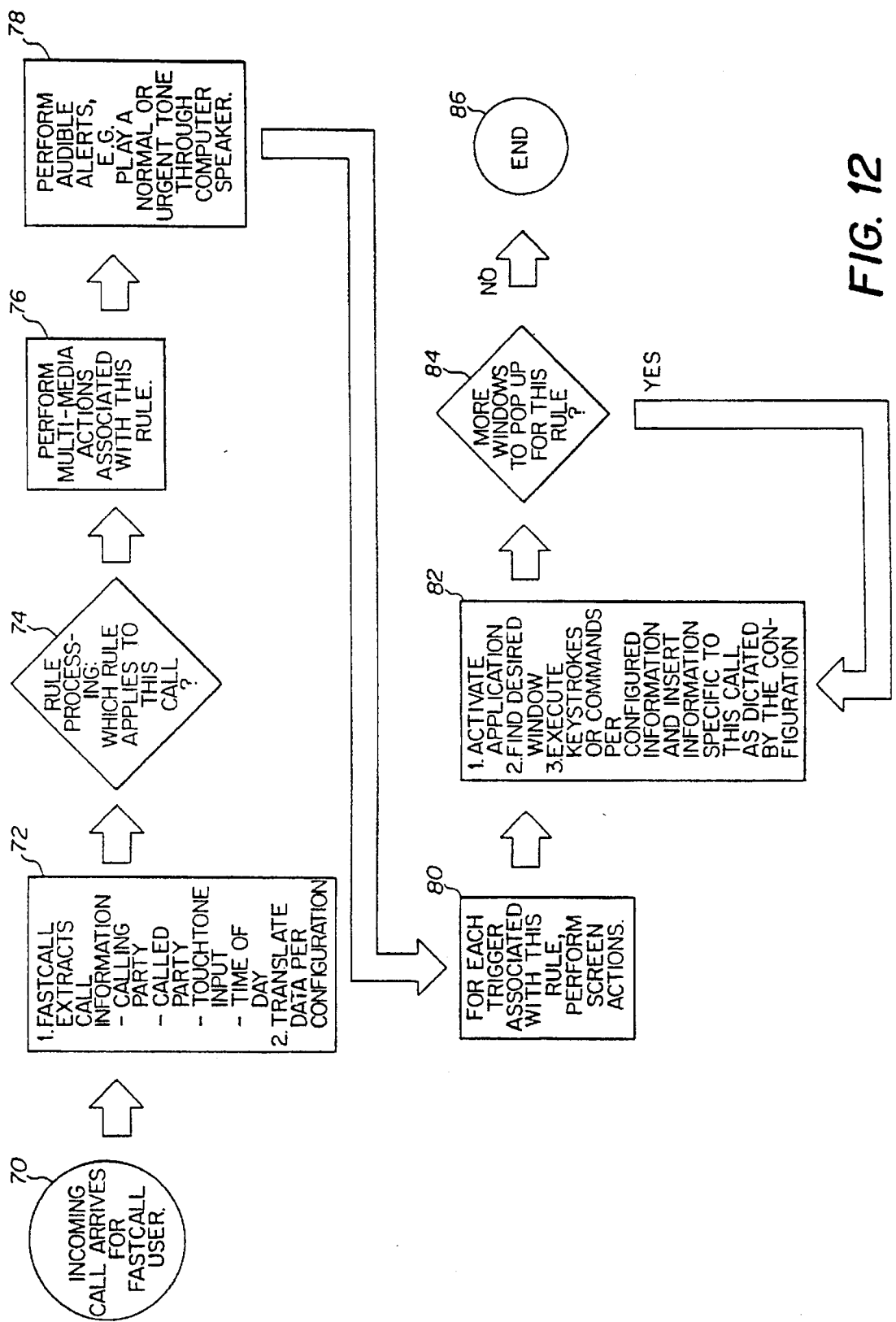
FIG. 12 is a block diagram of incoming telephone call processing according to the computer-telephone integration system of this invention once the set-up routine of FIG. 2 is accomplished.

After a call arrives, step 70, FIG. 12, call information is extracted, step 72, such as the caller's telephone number. A determination is then made as to which rule applies to the incoming call, step 74, the appropriate multi-media actions associated with the rule are performed, step 76, audible alerts are performed, step 78, and each trigger is activated, step 80. This activates the appropriate application, step 82. If more windows are accessed, step 84, processing returns to step 82, otherwise processing for this call ends, step 86. The application is automatically retrieved, and the correct window is activated automatically since middleware program 18, FIG. 1, enters the previously recorded commands and inserts the call information as required upon receipt of an incoming call. In essence, the user who knows how to access the various application programs on his/her system teaches middleware program 18 once how to retrieve the application programs in response to an incoming call and thereafter middleware program 18 automatically processes incoming calls.

So, for example, upon receipt of an incoming call step 70, FIG. 12, from a student, her telephone number is extracted, step 72, and the appropriate rule is invoked, step 74. The database application program is retrieved, step 82, and the grades (and/or financial aid) window is activated. Middleware program 18, FIG. 1, then automatically enters the previously recorded command string (step 28, FIG. 2) and inserts the extracted student phone number at the correct place in the command string. The telephone number, extracted from the switching device including board 14 and drivers 16, FIG. 1, is then inserted at the correct place in the command string to retrieve the grade information data for the particular student calling the administrative office.

Or, if an individual calls and requests information on making a charitable contribution, his phone number is extracted and a different rule is invoked, step 74, FIG. 12. The spreadsheet application program is retrieved, step 82, the correct charitable contribution window is activated, and the middleware program enters the correct spreadsheet commands to retrieve the callers charitable contribution information based on his phone number.

In this way, the user was not required to individually program computer 10, FIG. 1, to handle incoming calls based on the many possible different command sequences required to pull files and data from different application programs. The user is only required to "teach" middleware program 18, FIG. 1, what she already knows, namely the commands for each application program, and thereafter the program remembers the commands and correctly processes all future incoming calls.

Figure 13:
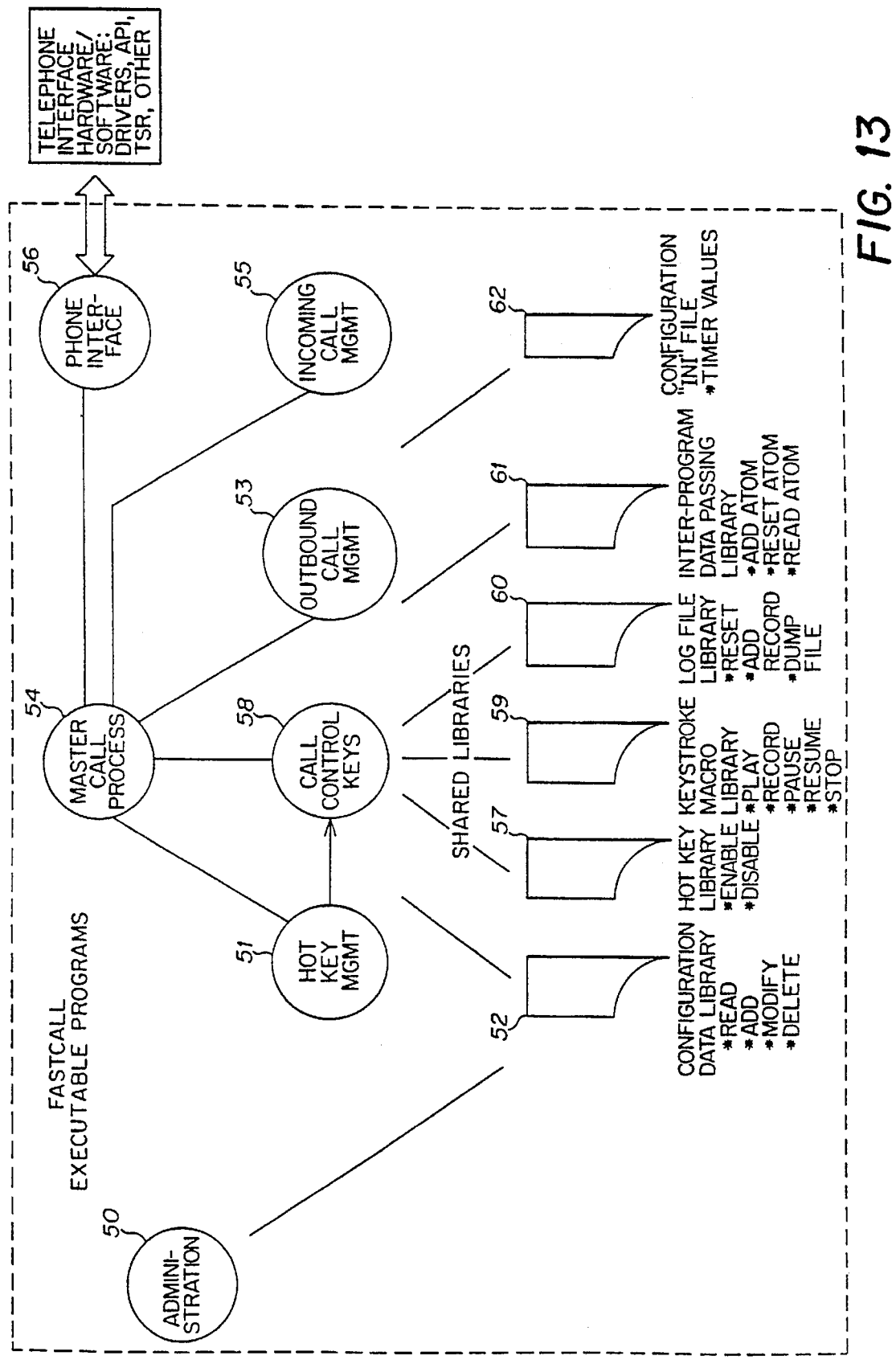
FIG. 13 is a block diagram of the relationship between the executable programs and the libraries of the computer-telephone integration system according to this invention.

The set up routine depicted in FIG. 2 is contained in a stand alone executable program. The entire software of the invention is depicted in FIG. 13, where the set up routine 50 is labeled "administration". The actual data configured in the setup routine is stored in a set of binary files. The command sequences, or "triggers" are stored in specially identified macro files that may be updated whenever the user re-records a new commands sequence for a specific application window. Many other configuration parameters, such as system telephone numbers, various user modes, local area code, etc. are stored in files as well, and are accessed as required during the processing of incoming and outgoing calls through the middleware. As setup information is entered by either the user or a site-wide administrator, this information is stored via the use of dynamic library commands, such as "add trigger", "delete trigger", "add rule", "modify rule", etc., as depicted by the Configuration Data Library 52. This library is then accessed by other programs 53–56 and 58 and libraries 57 and 59–62 that handle the call-by-call-processing, via commands such as "read trigger", "read rule", "read call numbers", etc. The function of the library is to provide a consistent way for multiple programs to simultaneously access the configuration files for reading, writing, or modifying.

If multiple applications or a variety of call handling scenarios are desirable, it may be necessary to establish and implement a set of rules for processing incoming calls. For example, student calls on one telephone number may be put through only during certain time periods when they invoke a financial aid database to pop-up on the user's screen, while telephone calls from wealthy individuals seeking to make charitable contributions would always be handled immediately and would invoke the charitable contribution spreadsheet. Establishing and implementing these precedential rules is described in more detail below.

Establishing Precedential Rules

Figure 17:
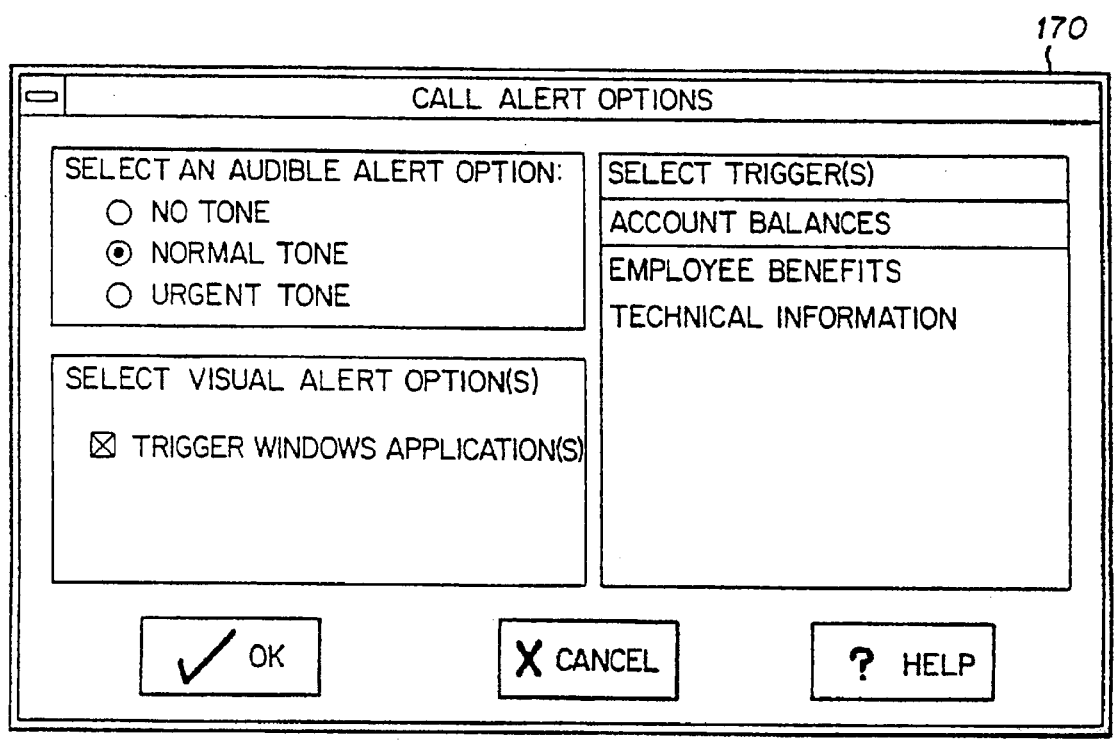
FIG. 17 is a view of screen for selecting call alert options.

The call processor for establishing and executing precedential rules according to this invention is described below. Once a decision is made to add, modify or delete incoming call rules, step 120, FIG. 14, the priority handling rules are established in order of priority as shown in step 122 for the first rule, step 124, and the priority is set to the number of the rule being established. See screens 150 and 160, FIGS. 15 and 16. The user enters the call information, step 126, FIG. 14, and then enters the rule handling criteria. For example, the time of day, the calling numbers, the called numbers, and/or caller input may form the criteria of the call handling rule to be established. The user enters the action desired, step 128. If the action desired is to accept the call, the user specifies the desired sound tone the computer will emit step 130, as shown in screen 170, FIG. 17 and then selects the "trigger", step 132. This trigger denotes which application program, window, and associated command sequence should be invoked for the call information chosen. If the action desired in step 128 is not to accept the call, the user specifies the forwarding number, step 134, also shown in screen 160, FIG. 16, plus an optional trigger. If there are more rules to perform after step 132 or 134, the process, in step 136, returns to step 124. If no more rules are to be performed, the process ends, step 138. All this information is stored, and the user then establishes the rule next in priority, step 124, FIG. 14.

The priority based rule sub-system used by the invention is based upon a boolean expression evaluation of specific criteria that an incoming call must meet. If an incoming call's information satisfies the criteria of a rule, that rule is executed. The rules are evaluated in a priority order, so that only the highest priority rule satisfied is executed. Rules are processed at various times during a call based upon user configurable modes, e.g. before a call is answered, as a call is answered, upon a user action, etc. Rules may be processed more than once for each call, as more information about the call is transmitted by the telephone switching device. This is particularly useful for calls that are transferred from one party to the user of the invention, in that when the transfer is completed, the information about the original call as well as the transferred party is transmitted to the invention, so that further computer commands, or triggers may be executed based upon this new information.

Figure 14:
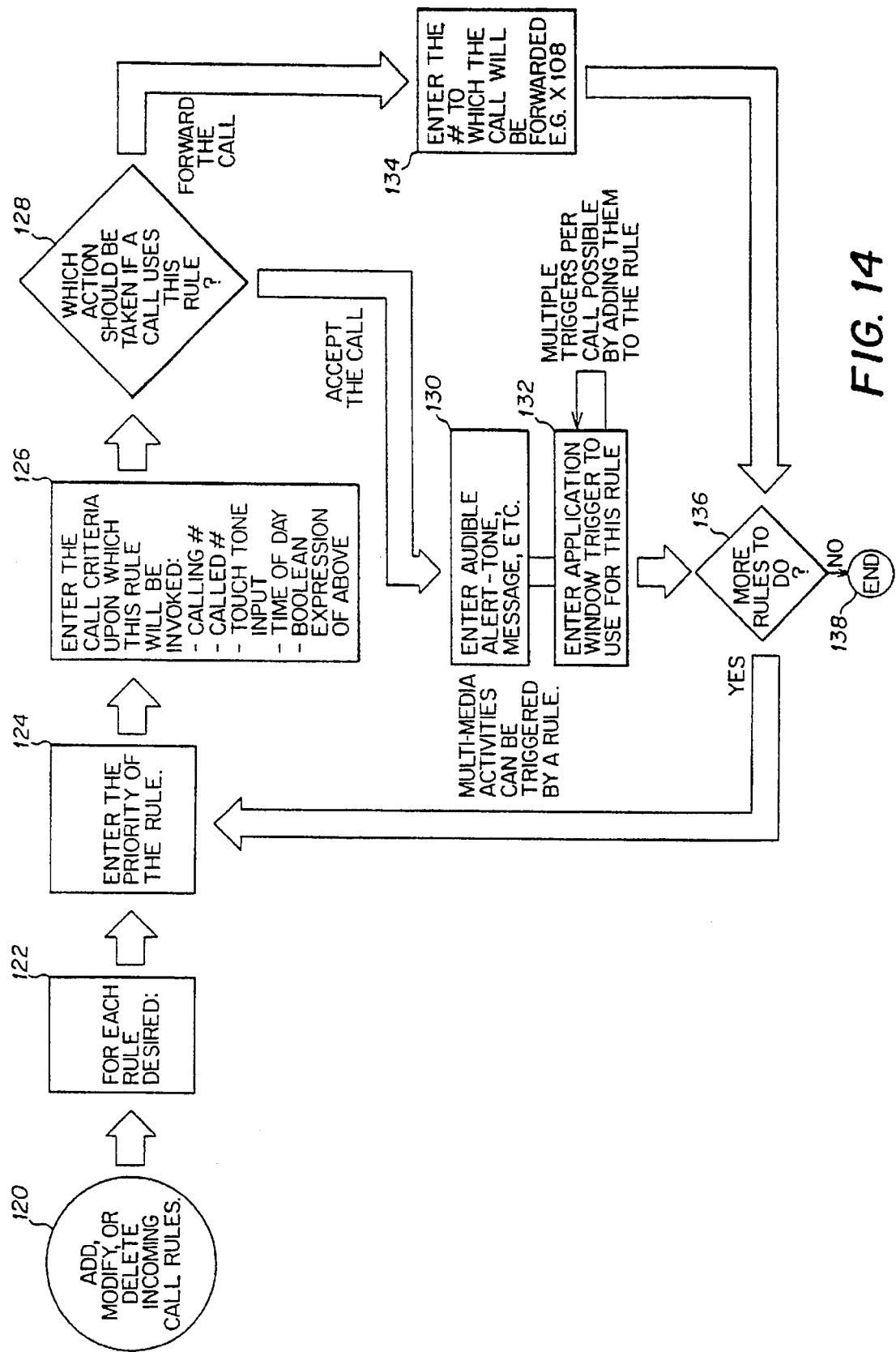
FIG. 14 is a block diagram of the routine for uniformly establishing precedential rules for the computer-telephone integration system of this invention.
Figure 18:
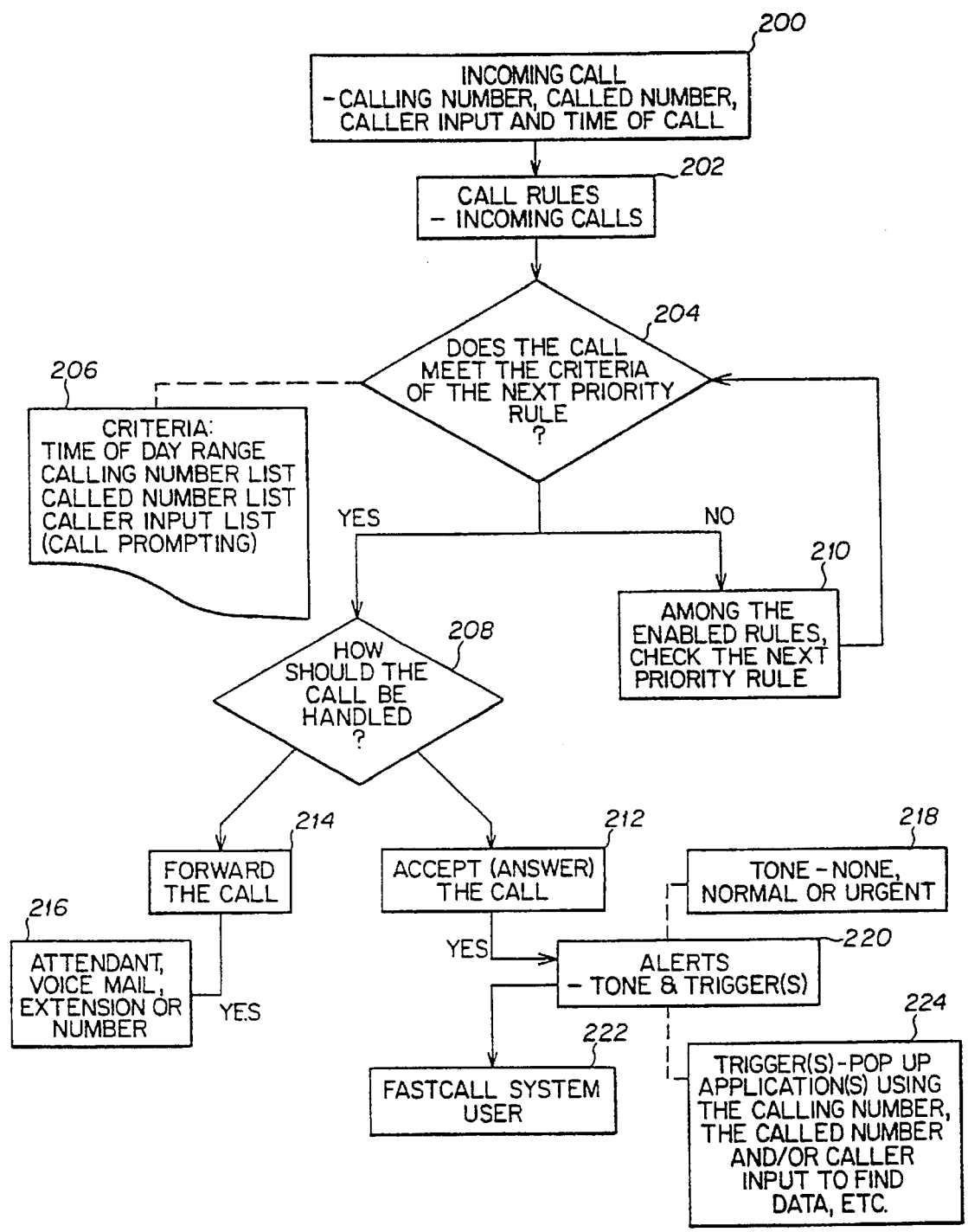

The criteria for the call may be based upon several pieces of information, including the calling party's number (or a translation of this number), the number dialed by the caller (or a translation of this number), touch tone input keyed in by the caller (or a translation of this number), and/or the time of day. A combination of multiple selections of the numbers and a time of day range may be specified in a boolean expression that requires "ALL" of the criteria to be met, i.e. if calling and called numbers are specified, then both must be matched for the rule to apply, or "ANY" of the criteria to be met, i.e. if calling and called numbers are specified, if either numbers are matched, then the rule applies. Extensions of the boolean expression to use are anticipated by the invention. FIGS. 14, 18, and 19 detail the rule process used by the invention, in increasing levels of detail. FIGS. 18–19 describe how the software actually handles a call and determines which rule applies, if any, for a given incoming call.

In step 200, FIG. 18, an incoming call arrives to the system. Information is passed to the system or is queried by the system from the telephone device. This information includes one or more of the following elements: calling number, called number, caller input (touch tones dialed by caller), and time the call was received.

The invention then enters a software loop, the purpose of which is to determine which, if any, of the predefined call rules applies to this particular call (step 202). Call rules may be dynamically enabled or disabled by the user, so that the loop is only processed for currently enabled rules, permitting temporary changes in call flow handling. In step 204, the call information is matched against the criteria (206) entered for the next highest priority rule (more detail on this is described below in association with FIG. 19). If a match is not found for this rule (step 210), the loop is continued and the call information is matched against the next priority enabled rule, until all enabled rules are exhausted. If a match is found (step 208) then the loop is exited, and the action specified by the rule is taken. This action can either be to forward the call to an alternative telephone number (NOT accept the call) as in steps 214, 216, or the action can be to accept (answer) the call as in step 212. If the call is accepted, then various activities occur; this invention anticipates general multimedia activity to result here, e.g. the playing of various predefined sounds, voice messages, etc. through the computer (step 220, 218), to the user (step 222), the triggering of application screens and commands that perform computer functions based upon the current call information (step 224).

Figure 19A:
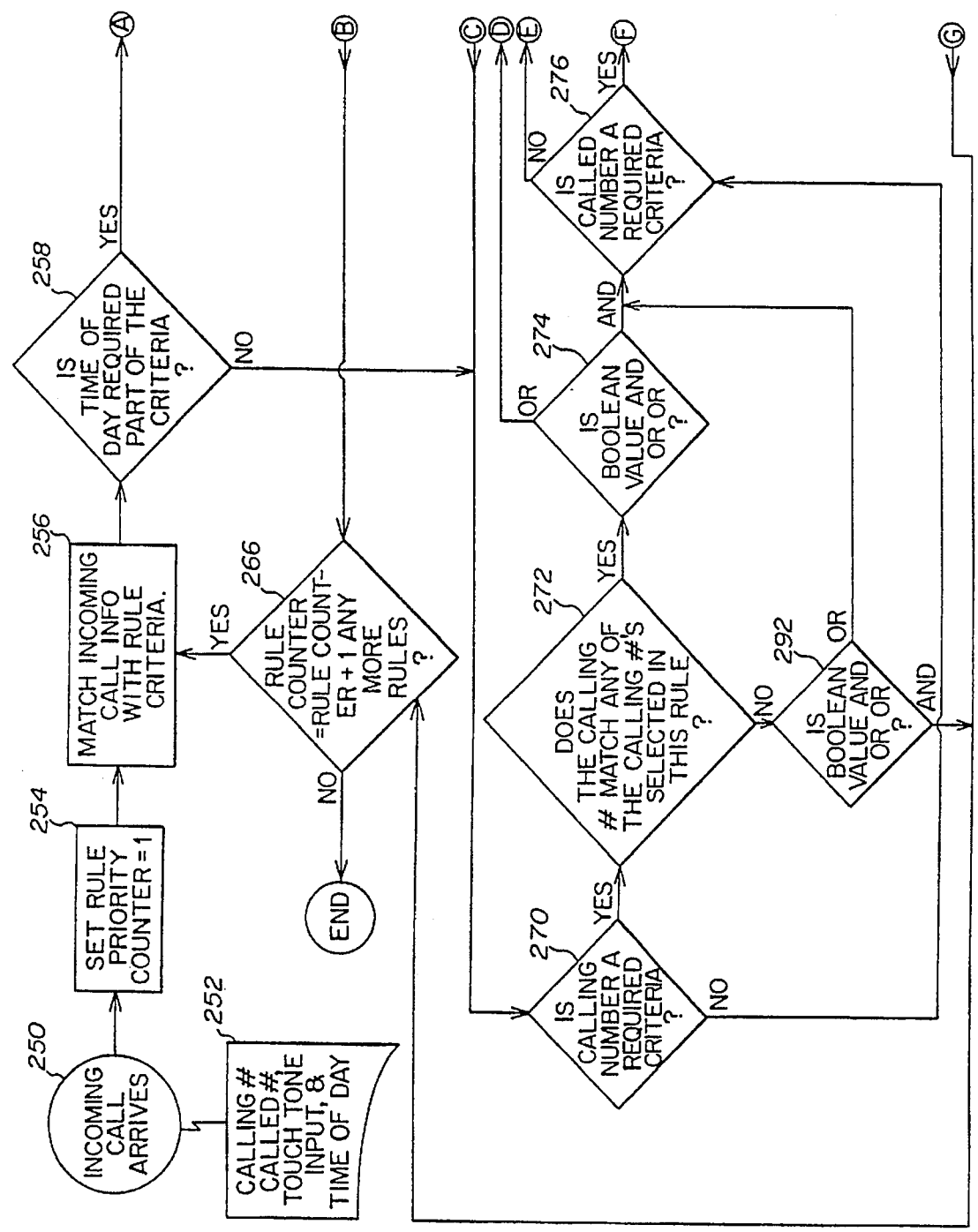
Figure 19B:
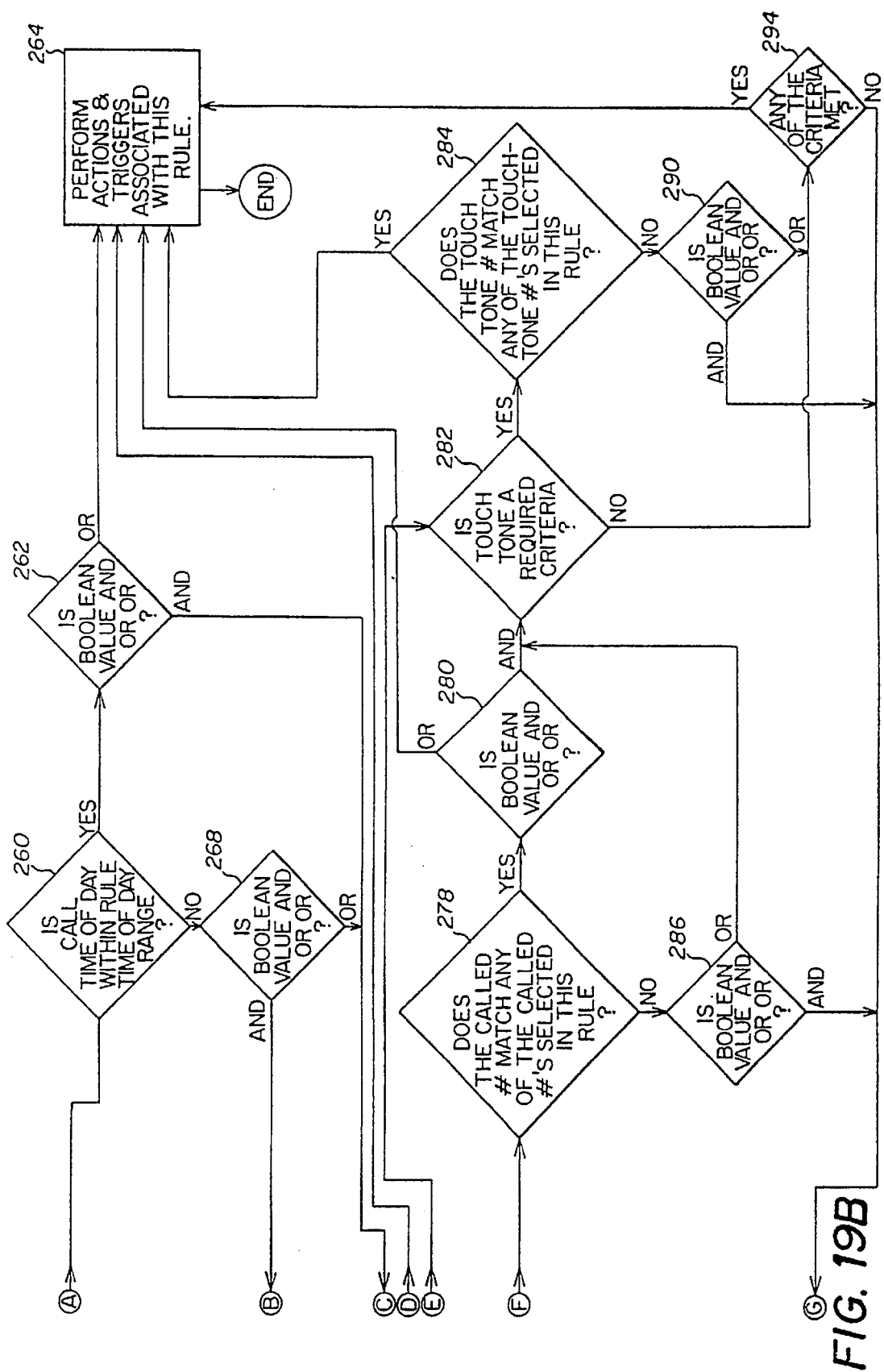

FIGS. 19, 19A and 19B provide more detail on how the incoming call rules process works. In step 250 the incoming call is received and detected in the software of the invention. Call information associated with the call is listed in box 252. In step 254, the software loop counter is set to 1, which means to search the rules in priority order, to find a match with the current incoming call, with rule number 1 corresponding to the highest priority rule, rule number 2 being the second highest priority, etc. In step 256, the process to match the call information against the next rule's criteria is begun. The criteria consists of a boolean expression of zero or more of the following elements: time of day, calling number, called number, and caller's touch tone input. The boolean expression can either be a logical AND of these elements, or a logical OR of these elements. Each rule can specify zero, one, two, three, or all four of the elements to be a required match, i.e. the rime of day is a required part of the criteria, the calling number is a required part of the criteria, etc. If a logical AND is selected for the boolean expression, then all of the required criteria elements must contain a match to the current call for the rule to apply (i.e. match as a whole). If a logical OR is selected for the boolean expression, then if any of the required criteria elements match the current call, then the rule should apply.

The process of matching call criteria elements is described in step 258–294. In step 258, the invention determines if the rule the call information is being matched again has rime of day as a selected required criteria. If not, processing proceeds to the next criteria step 270. If time of day is a required element, then the current time is matched against the time of day range entered in the rule to determine if the current time falls within the range specified step 260. If it does not step 268 and the boolean expression setting is AND, the rule will not apply, and the program proceeds to the next loop counter (next highest priority rule) to see if there is a match, step 266. If there are not more rules, the program terminates and no action is taken. If the time range does not match and the boolean expression is OR, then the rule may still apply, so processing continues with matching the next criteria element (calling number) in step 270. In step 262, if the current time does fall into the specified time range and the boolean expression setting is OR, then the rule is matched, step 264 and the multimedia actions specified in the rule are taken by the invention as described above. If the time range match and the boolean expression setting is AND, then the rule may apply, if other criteria are met, and processing continues with matching the next criteria element (calling number) in step 270.

In step 270, the invention determines whether the current rule specifies a calling number match as a selected criteria. If not, processing continues with matching the next element, called number, step 276. If calling number match is specified, then the current call calling number is matched against the list of selected telephone number identified with this rule, step 272. If there is a match of any of the selected calling number with the current calling number, step 274, then the boolean expression setting is examined. If it is set to OR, then the rule matches, and the multimedia actions for this rule are taken, step 268. If it is set to AND, then this rule may still apply, if all other criteria specified are met, and processing continues with the next element of the criteria (called number) in step 276. If there is no match between the calling numbers selected and the current calling number, step 292, then if the boolean expression setting is AND, this rule is not a match, and processing continues with the next rule, step 266. If the boolean expression is OR and there is no calling number match, then the rule may still be a match if any of the next criteria are a match and processing continues with matching called number is selected, step 276. The same processing for called number and caller touch tone input is done as is with calling number, in steps 276–290 and 294 to determine whether the rule is a match or not. If a match is found, the appropriate actions specified with the rule are taken. If no match is found, the appropriate actions specified with the rule are taken. If no match is found the next rule is examined (in priority order) for a match until no more enabled rules exist, step 266.

All calls go through the rule examination process when the call is first received, when the call is answered, upon user command, or a combination of these, as the user dictates. This provides the user with the ability to determine when and how call-related multimedia events will occur. This invention anticipates extensions to the criteria, boolean expression, and actions which may be specified in each rule. These actions include but are not limited to: popping up a screen or window of information; popping up multiple screens in a specified order; keystroke command emulation using call information or a translation of the information; inter-program communications, such as dynamic data exchange, and application linking; and other forms of scripted commands, potentially a built in call macro language that could launch applications search files for information, etc.

Uniform Configuration for Different Switching Devices

Not all telephone switching devices use the same communication protocols for common telephone functions such as "dial", "answer", "hangup", "hold", etc. Heretofore, the interface between the switching device and the users computer system would be hard coded by those skilled in the computer science arts, but then the users computer-telephone integration system would be switch dependent.

According to this invention, however, a switching device independent state machine for handling the different communication protocols for different telephone switching devices is accomplished as follows.

Figure 22A:
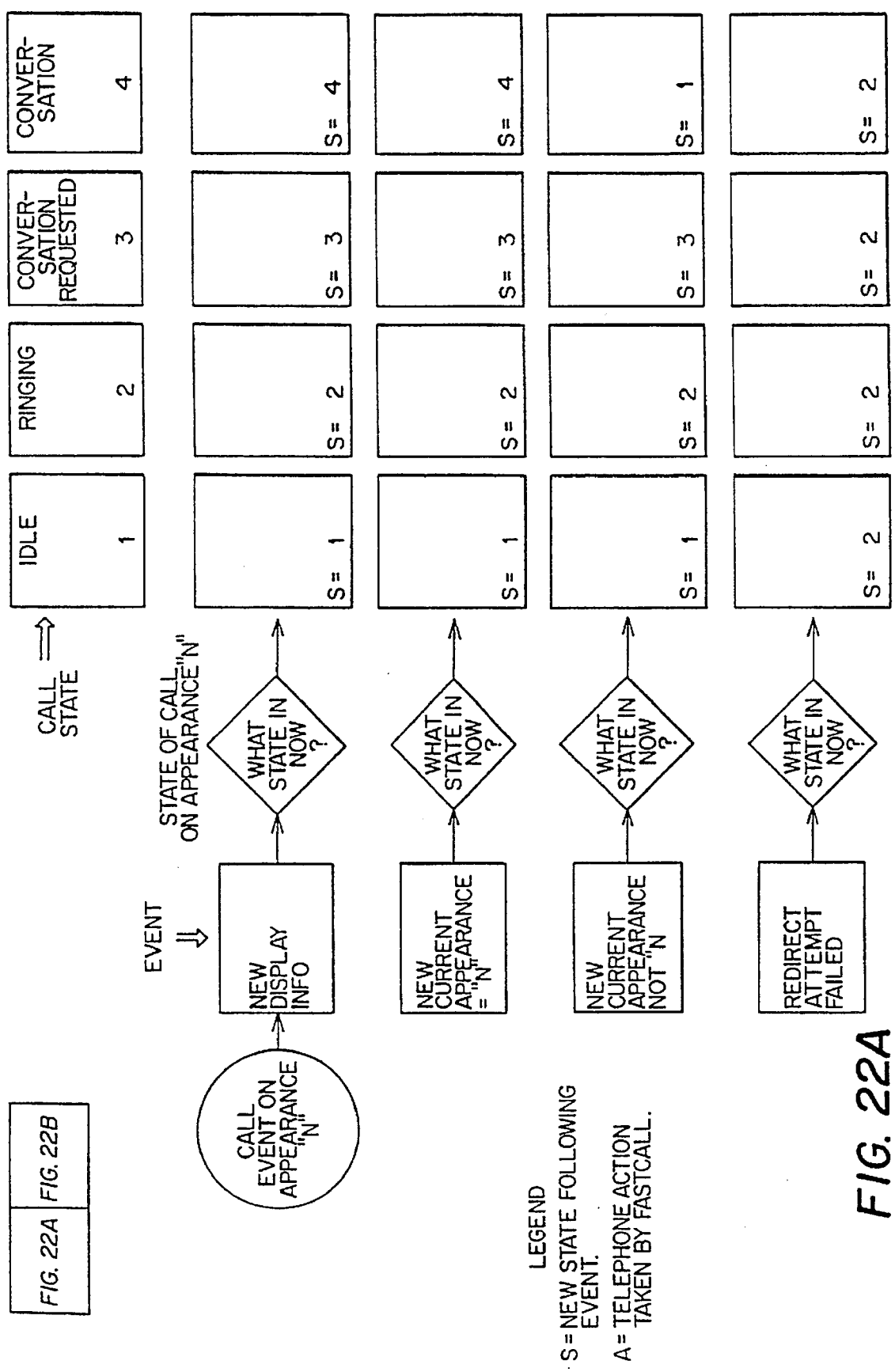
Figure 23A:
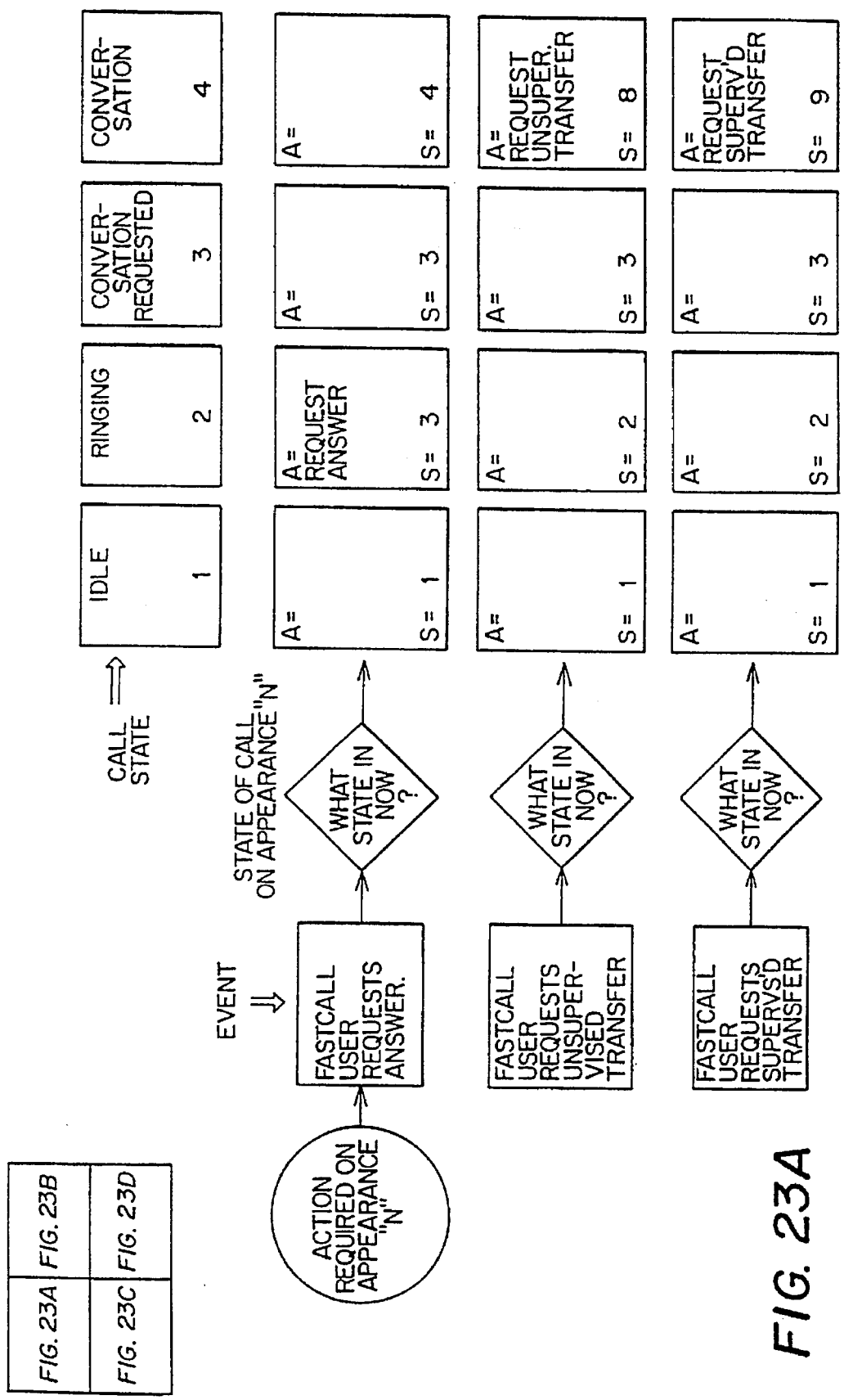
Figure 23C:
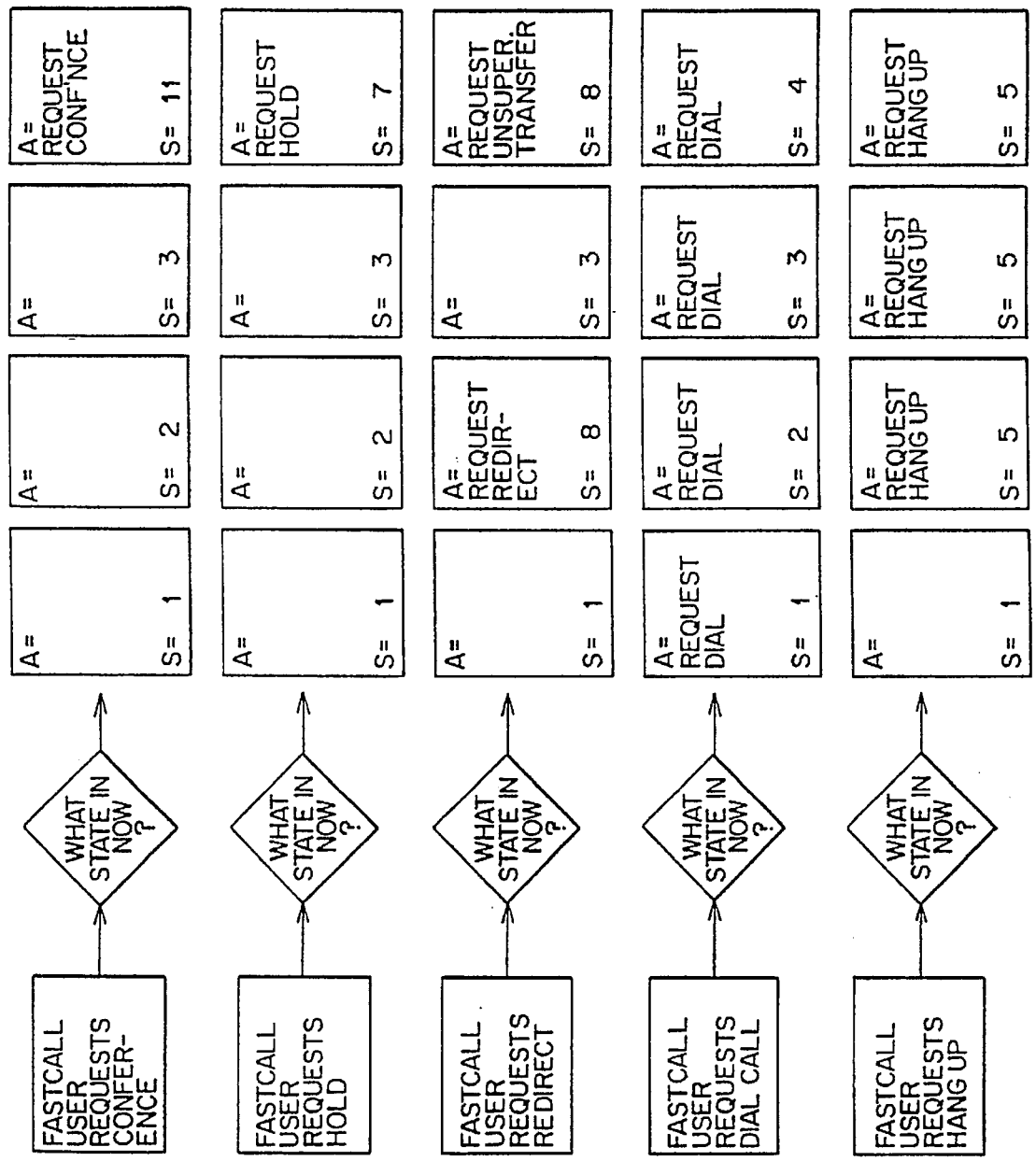

FIGS. 20–20D, 21–21D, 22–22B, and 23–23D describe the State Machine of the invention. This State Machine is comprised of 11 states that a call Oncoming or outgoing) may be in. The states are labeled 1 through 11 across the top of the figures. The columns in the body of the tables define the new state of a call that is currently in the state indicated at the top of the column. This state "S" may change based upon an event described on the left-hand side of the table. These events are one of two kinds: an event generated by and transmitted by the telephone switching device (FIGS. 20–20D, 21–21D, and 22–22B) or actions requested by the user (FIGS. 23–23D). These events are represented in the software of the invention by inter-program messages passed between the various software programs of the invention as shown in FIG. 13. The State Machine is embodied in MASTER CALL PROCESS program 54. When an event from the telephone switch occurs, it is first made known to the PHONE INTERFACE program 56, via telephone switch-dependent communications. The PHONE INTER- FACE program 56 in turn notifies the MASTER CALL PROCESS program 54 via a uniform; i.e., switch-independent communication, so that the State Machine can perform the approximate actions and change states if required. When user request events occur, they are first received via the CALL CONTROL KEYS program 58; i.e., the user interface. CALL CONTROL KEYS program 58 in turn communicates the action requests to the MASTER CALL PROCESS 54 for handling and potentially for the transmission of commands to the telephone switching device to carry out the user requests. These commands would be sent by a uniform telephone switch, device-independent communications format from the MASTER CALL PROCESS 54 to the PHONE INTERFACE process 56, which would, depending upon the type of switching device, send one or more directives to carry out a telephone function request, such as hang up call, dial, etc.

Figure 20A:
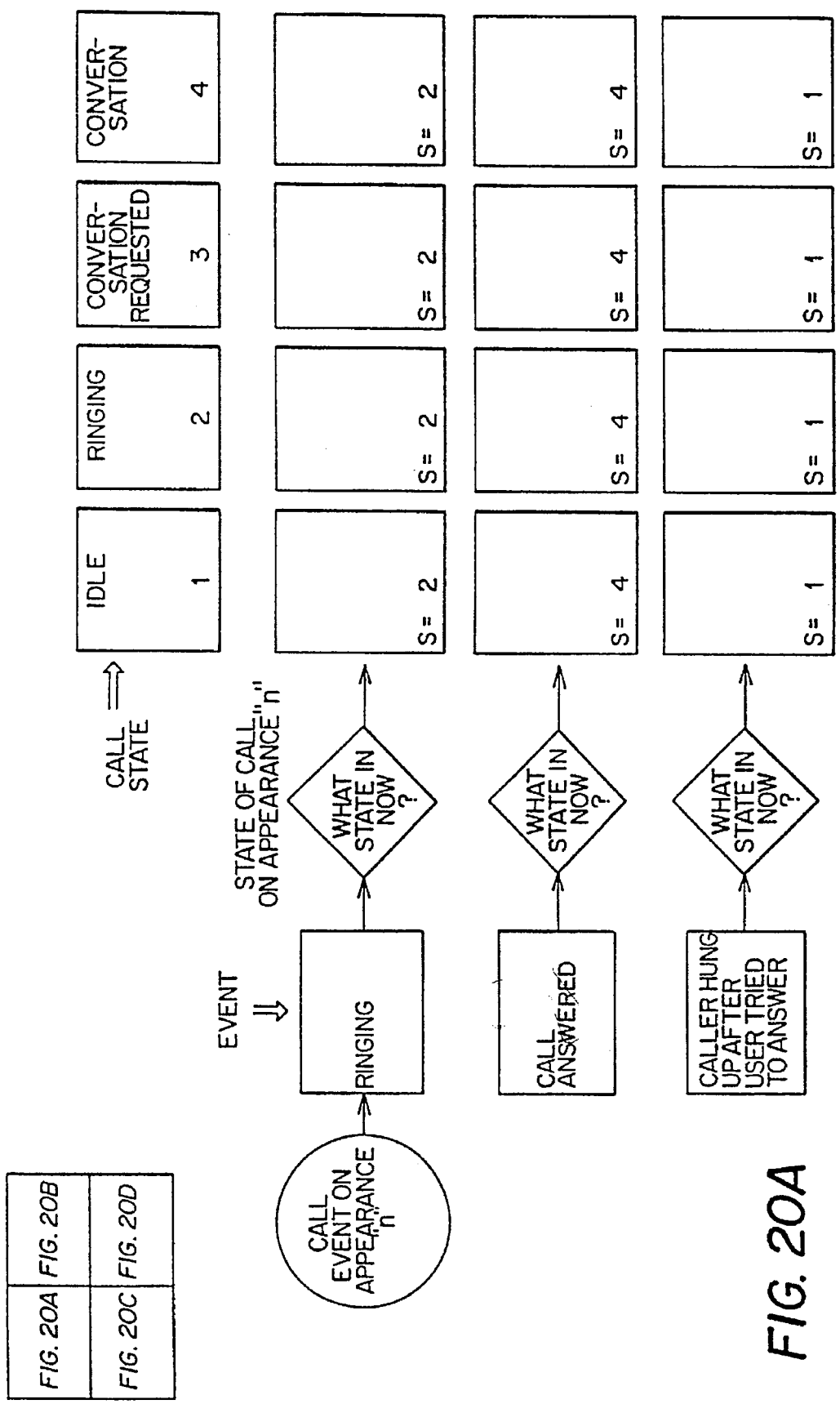
Figure 20C:
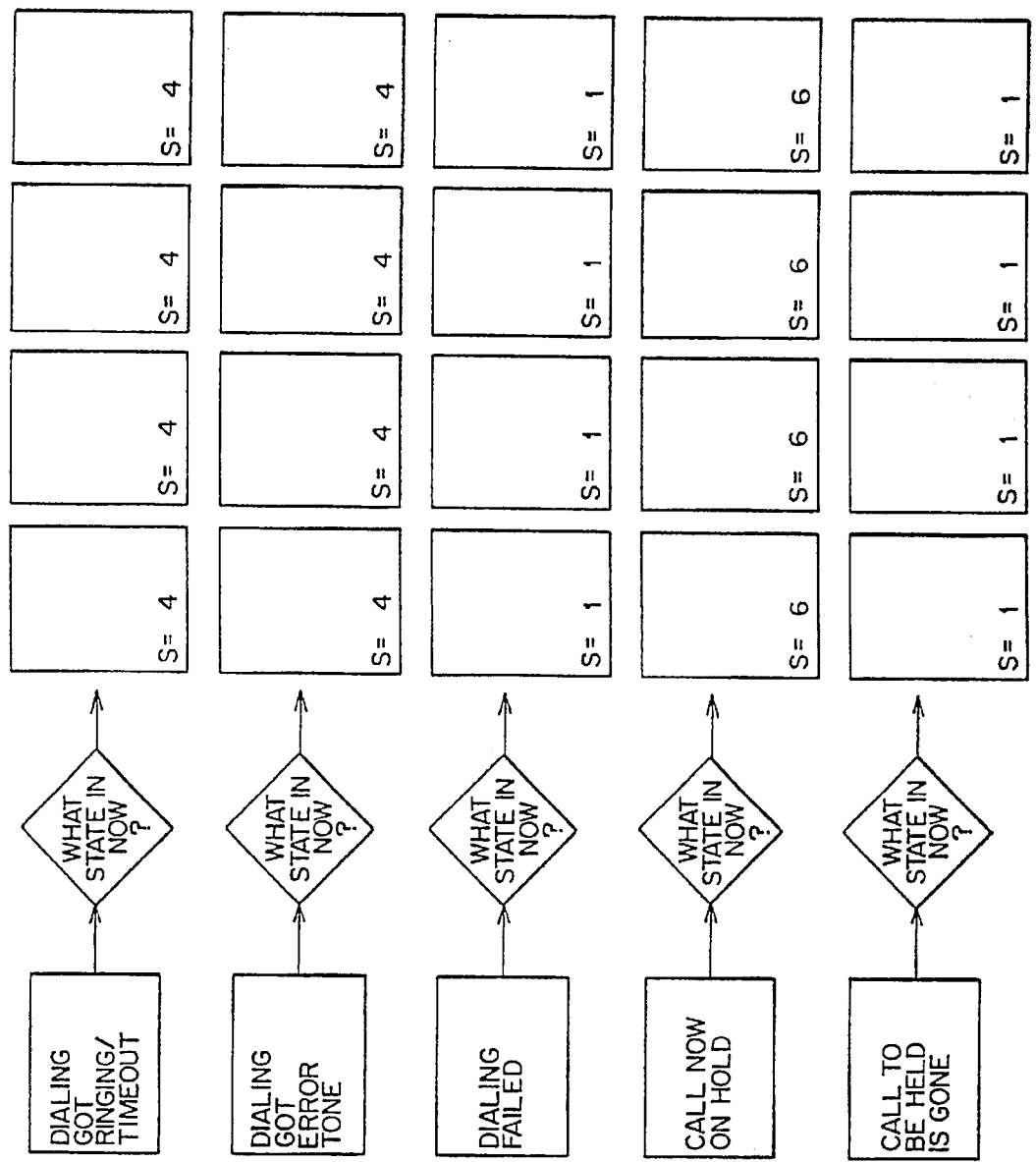
Figure 20D:
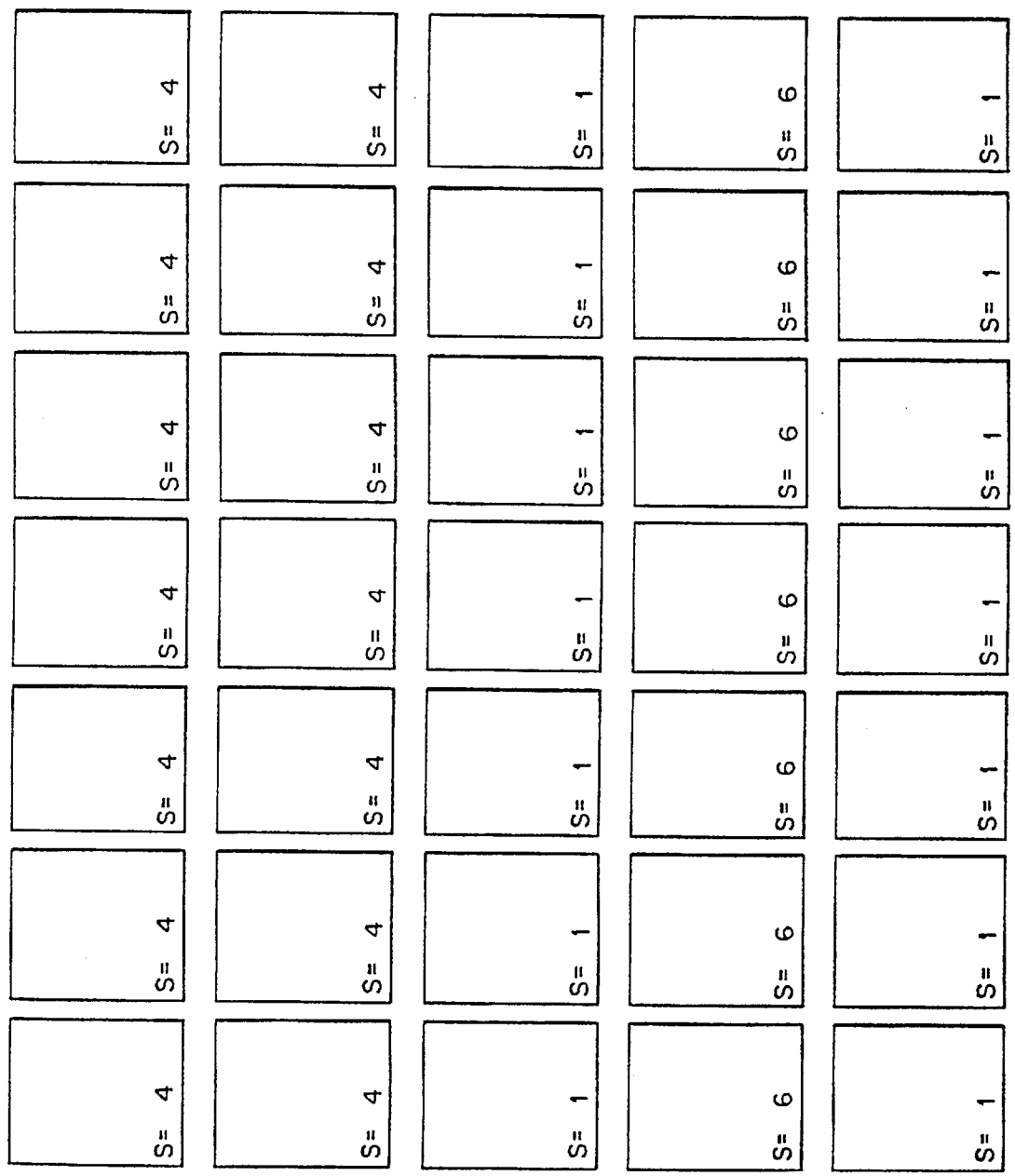
Figure 21A:
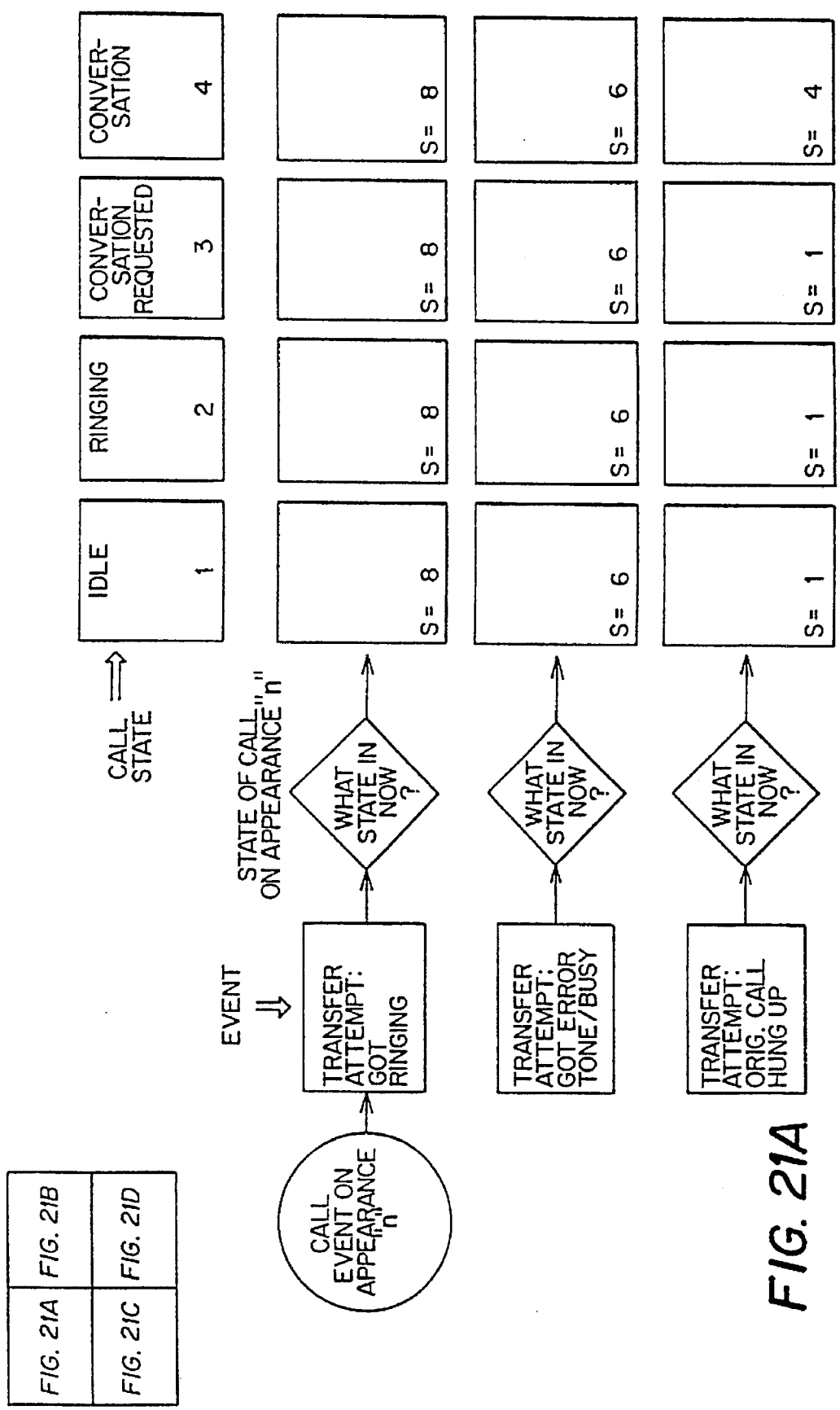
Figure 21B:
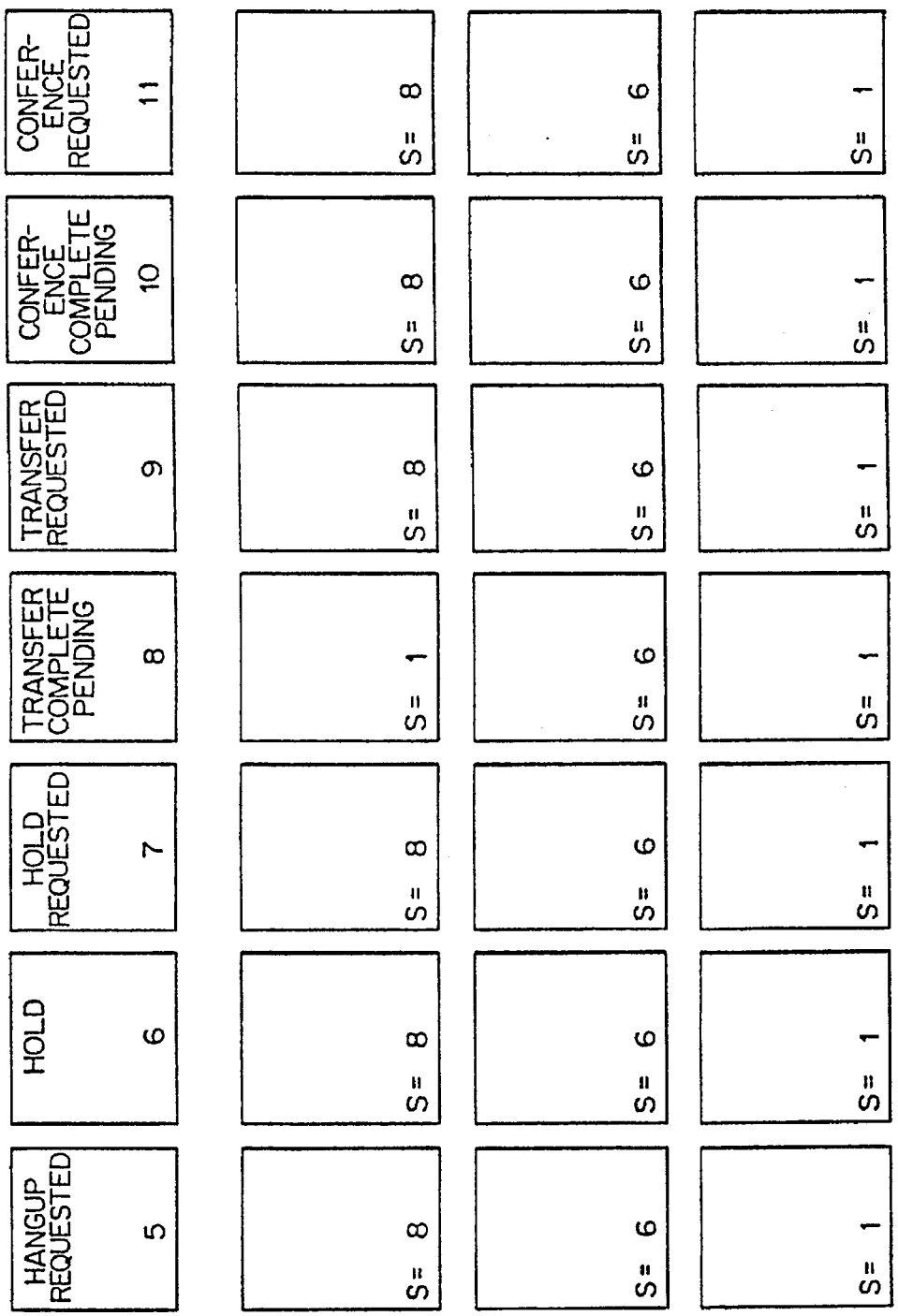
Figure 21C:
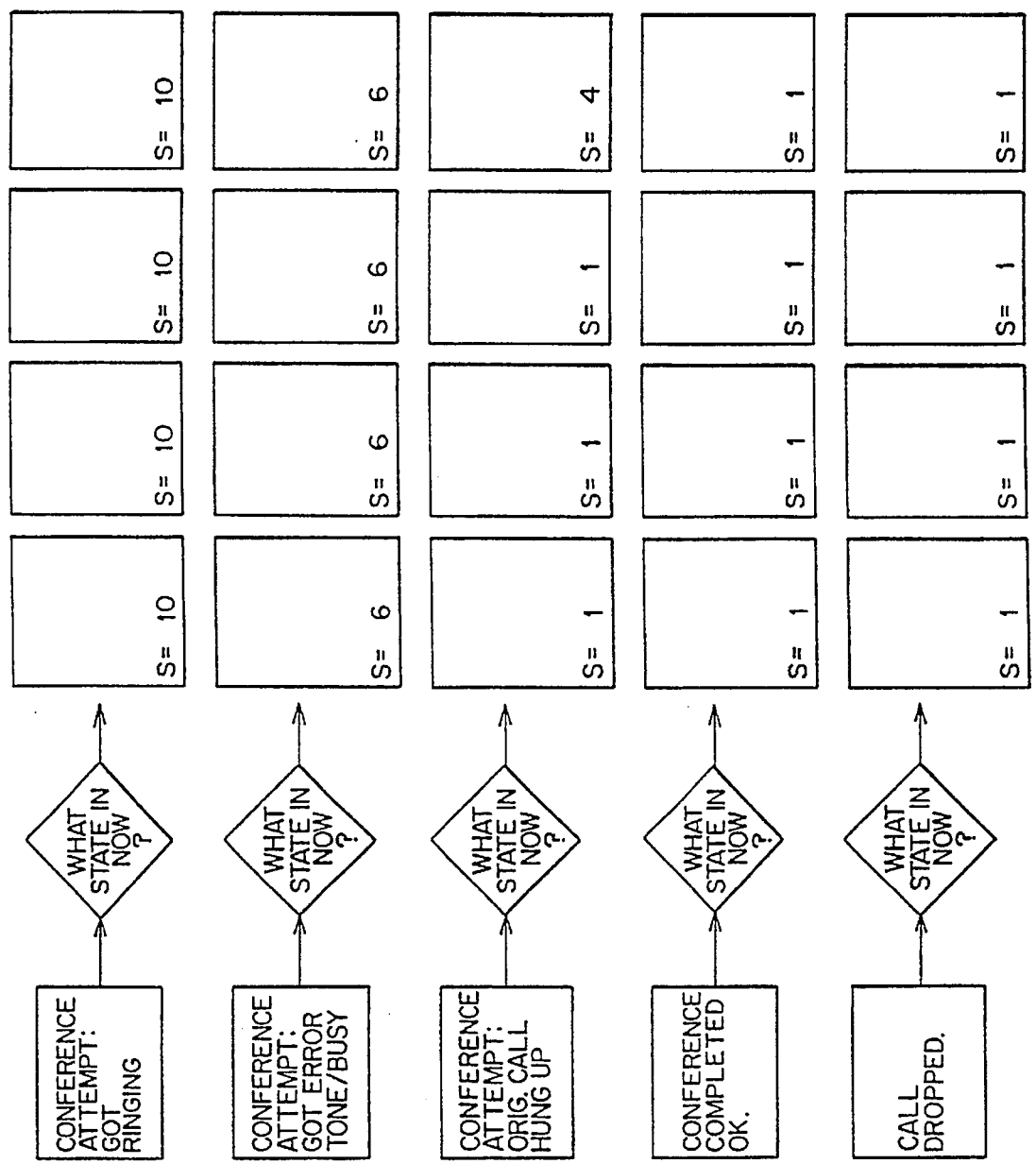
Figure 21D:
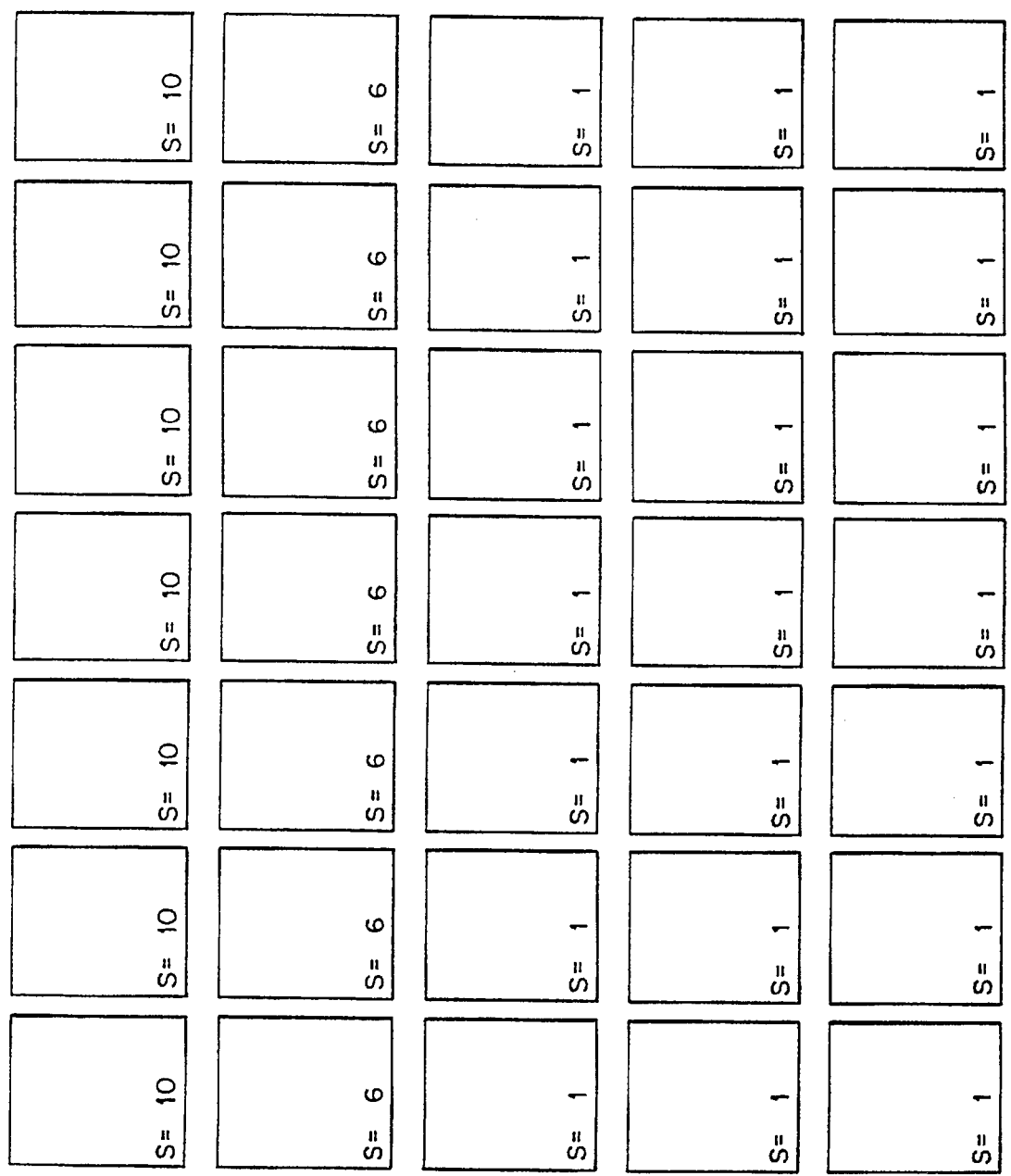

The uniform telephone switching device independent communications format between the MASTER CALL PROCESS 54 and the PHONE INTERFACE PROCESS 56 takes the shape of messages, which correspond to the events listed down the left hand side of FIGS. 20, 21, and 22. Each appearance on a telephone device may have events associated with it, and these events are translated into data messages sent from the PHONE INTERFACE PROCESS 56 to the MASTER CONTROL PROCESS 54. For example, when a new call comes to the telephone device, i.e. the telephone "rings", then the PHONE INTERFACE PROCESS 56 would detect this and send a "RINGING" message to the MASTER CALL PROCESS 54 for the appearance that is ringing. This is shown as the top event in FIGS. 20–20D. The set of messages include the following, as indicated in FIGS. 20–20D, 21–21D, and 22–22B, but are not limited to those below, as extended features of telephone device capabilities may be added to the state machine in the future, as new events and messages.

| | |
|---|---|
| RINGING | Incoming call is arriving (ringing). |
| ANSWER(TRUE) | Call has been answered successfully. |
| ANSWER(FALSE) | Call was attempted to be answered, but the answer failed. |
| DIAL(RING) | An outgoing call successfully received ringing on the far end or timed out after a configurable number of seconds |
| DIAL(TONE) | An outgoing call resulted in a busy signal or other invalid tone on the far end |
| DIAL(FALSE) | An outgoing call could not be placed |
| HOLD(TRUE) | A call just successfully went on hold |
| HOLD(FALSE) | A call that was attempted to be put on hold could not be put on hold because the far end party hung up |
| XFER(RING) | A transferred call got ringing or a timeout on the far end (party to whom call wold be transferred) |
| XFER(TONE) | A transferred call got a busy or invalid tone on the far end (party to whom call would be transferred) |
| XFER(FAIL) | A transfer failed because the original connected party hung up |
| CONF(RING) | A conference call got ringing or a timeout on the far end (party to whom call would be transferred) |
| CONF(TONE) | A conference call got a busy or invalid tone on the far end (party to whom call would be transferred) |
| CONF(FAIL) | A conference failed because the original connected party hung up |
| CONF(TRUE) | A conference completed successfully |
| DROP(TRUE) | The user hung up the telephone |
| NEWDISP( ) | A new display is appearing on the telephone |
| CURRENT(APP) | A new appearanre is now the active appearance among the multiple appearances |
| REDIR(FALSE) | An attempt to redirect a ringing call to another extension failed. |

The State Machine controls all of the "run time", i.e., call processing, activities of the invention, in the sense that each action taken by the invention is triggered by either a user request or an event transmitted by the telephone device. In other words, the run time portion of the invention is completely "event driven", and the actions that are taken based upon the event are embodied in the State Machine. The actions taken by the State Machine in the MASTER CALL PROCESS include various functions; such as, writing records to call logs, sending messages to programs to invoke triggers, pop-up application screens, place calls, etc. The communication between all programs within the invention is done in a uniform messaging scheme which is telephone switching device, and application independent. Telephone switching device dependent communications are strictly isolated to the one PHONE INTERFACE process 56, thereby providing the uniform product claimed herein.

There are three other process elements in the software of the invention shown in FIG. 13. Process 51 is the hot key management process. This includes the use of a "hook" within the Windows environment that allows a hot key to be globally defined that will bring up the user interface of the invention (process 58) no matter what state or application the user may currently be in. This hot key may be specified within a defined list of choices given to the user. The hot key is used to toggle the state of the user interface. If the user interface is active, then the hot key will minimize the user interface to an iconized state. If the user interface is not active but visible, the hot key will make the user interface the active window for the user. If the user interface is in an iconized inactive state, then the hot key will restore the user interface window and make it the active user window.

Process 53 is the outbound call management process. This process is activated upon the entering of the outdialing "hot keys" by the user that signal the outbound call management process to extract call information, specifically a number to be dialed, from an application, and then to dial this number. The outbound call management process decides which application to extract the called number from, extracts the number, and then passes a dial request message to the Master Call Process (54) for actual placement of a call. The outbound call management process makes it decision on which application the information is to be taken from, based upon the fact that it is the last application that was active with the user prior to the hot key dialing request being initiated. The commands required to extract the telephone called number are retrieved form files configured (trained) earlier by the user for this particular application and current window, called outgoing call triggers). If the user requests a hot key dialing, and the last active window has no associated command file, the outbound call management process does not send any dial requests to the Master Call Process.

Process 55 is the incoming call management process. This process is responsible for running the rules matching algorithm specified in FIGS. 18, 19, 19A and 19B. The incoming call management process is invoked at various times based upon the user's configuration. It may be invoked when incoming calls first arrive, upon the user answering the call, whether call information changes, or upon user demand.

There are four other library elements and one module in the software of the invention described in FIG. 13. Library 57 is the hot key library. It contains the functions to enable or disable a new hot key as the key that will activate and deactivate the user interface. Library 59 is the keystroke macro library. This library contains the functions required for the user to record and playback computer keystroke commands that are associated with incoming and outgoing call triggers. Library 60 is the log file library. It contains the functions that read and write call records to call log file, so that a user can retrieve a history of the calls placed or received. Library 61 is the inter-program data passing library. It contains the functions that create data elements that are passed among the various modules within the invention. These data elements typically include basic call information such as the calling number, called number, telephone display characters, etc.

Module 62 is a timer configuration file that specifies timing values specifies timing values specific to telephone call processing. This file allows the invention to change how it reacts to error conditions in the telephone device. For example, if a call is placed, but no ringing or busy tone is ever detected by the telephone device, the invention will "time out" and assume the call is completed after a certain number of seconds, specified in this configuration file. The adjustment of these time values allows for a variety of performance conditions for the user, depending upon how the user wants the system to react under such error conditions.

Although specific features of the invention are shown in some drawings and not others, this is for convenience only as some features may be combined with any or all of the other features in accordance with the invention.

Other embodiments will occur to those skilled in the art and are within the following claims:

What is claimed is:

1. A computer telephone integration system comprising:
   a computer integrated with a telephone system, the computer having a plurality of independent application programs that are operable thereon, and the computer having files containing data that are retrievable by any of the plurality of independent application programs;
   a user interface, disposed on the computer, for allowing a user to enter and store first commands on the computer to retrieve and run any of said independent application programs and a second command to access one of said files containing data with an application program, the user interface allowing the user to associate the first commands and the second command with call information received from the telephone system at the reception of an incoming call or with call information provided by the user at the initiation of an outgoing call; and
   a call processor means disposed on the computer and coupled to the user interface, for automatically executing said first commands and said second command upon receipt of said received or provided call information.

2. The computer telephone integration system of claim 1, wherein said user interface includes a first software menu option, presented on a display of the computer, for allowing the user to specify the received or provided call information and the first commands to be run in response to said received or provided call information.

3. The computer telephone integration system of claim 2, further including a second software menu option presented on the display, for allowing the user to specify the files containing data to be accessed with the application program in response to said received or provided call information.

4. The computer telephone integration system of claim 1, wherein the user interface includes a means for entering and storing on the computer, rules for handling the incoming call or the outgoing call, each rule having criteria which the call information must meet before the rule is executed and each rule having an action to be taken when the call information meets the respective criteria.

5. The computer telephone integration system of claim 4, wherein the rule criteria include at least one of a calling party's number, a called party's number, time of day information, and DTMF data.

6. The computer telephone integration system of claim 4, wherein the user interface further includes a means for denoting an order of priority for each rule, and wherein the call processor means evaluates each rule in the order of priority of the rule to determine whether the call information meets the rule criteria.

7. The computer telephone integration system of claim 4, wherein the call processor means further includes a means for analyzing which rule criteria are met by the call information.

8. The computer telephone integration system of claim 4, wherein the action to be taken when the call information meets the rule criteria is to accept the incoming call.

9. The computer telephone integration system of claim 4, wherein the action to be taken when the call information meets the rule criteria is to forward the incoming call to a predefined destination.

10. The computer telephone integration system of claim 1, wherein said computer further includes:
   a library of vendor specific switching device commands corresponding to a plurality of vendor specific switching devices;
   a stored set of telephone commands for performing telephone functions with the computer; and
   a state machine means, coupled between a switching device and the call processor means and being responsive to vendor specific switching device commands from the switching device and telephone commands from the call processor means, for translating between the vendor specific switching device commands and the stored set of telephone commands, for executing the telephone commands, and for outputting the vendor specific switching device commands to the switching device so as to uniformly perform incoming telephone functions and outgoing telephone functions.

11. The computer telephone integration system of claim 10, wherein the state machine means detects an event occurring on the switching device by receiving a switching device command, and communicates the event to the call processor means by outputting a corresponding telephone command.

12. The computer telephone integration system of claim 11, wherein the call processor means in response to receipt of the telephone command corresponding to the event occurring on the switching device, initiates the state machine means to determine a next state of the state machine means and to determine the telephone command corresponding to the next state.

13. The computer telephone integration system of claim 11, further comprising a call controller coupled to each of the user interface and to the call processor means, the call controller in response to receipt of a telephone command corresponding to an event initiated by the user at the user interface, communicating the telephone command to the call processor means, the call processor means in response to the telephone command initiating the state machine means to determine a next state of the state machine means and determine the telephone command corresponding to the next state.

14. The computer telephone integration system of claim 10, wherein the state machine means executes the telephone commands so as to uniformly process the incoming telephone functions and the outgoing telephone functions independently of a manufacturer of the switching device.

15. The computer telephone integration system of claim 1, wherein the computer receives the call information from a switching network external to the computer telephone integration system.

16. The computer telephone integration system of claim 1, wherein the first commands include keystroke commands that are entered by the user for retrieving and running any of the independent application programs.

17. The computer telephone integration system of claim 1, wherein the user interface allows the user to enter the first commands which are keystroke commands to retrieve and run the independent application programs and the second command for retrieving the files containing data with the independent application programs so as to configure the computer telephone integration system independent of a manufacturer of the independent application program.

18. The computer telephone integration system of claim 1, wherein the first commands include commands provided by one independent application program to another independent application program for accessing the another independent application program with the one independent application program.

19. A method for uniformly establishing a system for call handling on a computer integrated with a telephone system, the method comprising the steps of:

establishing and storing on the computer a list of called party telephone numbers including at least one phone number of a called party to be called with the system;

establishing and storing on the computer a list of calling party telephone numbers including at least one phone number of a calling party that may call the system;

establishing and storing on the computer first commands for retrieving and running any one of a plurality of independent application programs operable on the computer and second commands for retrieving data files associated with any one of the plurality of independent application programs; and establishing and storing on the computer a link for linking any one of the calling party telephone numbers and the called party telephone numbers with the first commands and the second commands.

20. The method of claim 19, further comprising the step of entering and storing on the computer a window corresponding to each link in which an application program and a data file will be displayed.

21. The method of claim 20, wherein the first commands include keystroke commands for retrieving and running any one of the independent application programs and for displaying the data file associated with the independent application program in the corresponding window.

22. The method of claim 20, wherein the first commands includes commands provided by one independent application program to another independent application program for accessing the another independent application program and for displaying the data file associated with the another independent application program in the corresponding window.

23. The method of claim 19, further comprising the step of establishing and storing on the computer rules for handling an incoming call or an outgoing call with the system, wherein the step of establishing each rule includes:

entering and storing on the computer criteria which the incoming call or the outgoing call must satisfy before the rule will be executed;

entering and storing on the computer an action to be taken when the incoming call or the outgoing call meets the criteria; and associating the link with the rule.

24. The method of claim 23, wherein the criteria include at least one of the calling party's number, the called party's number, time of day information, and DTMF information.

25. The method of claim 23, wherein the step of establishing and storing the rules for handling the incoming call or the outgoing call includes entering the rules in an order of priority.

* * * * *

UNITED STATES PATENT AND TRADEMARK OFFICE
CERTIFICATE OF CORRECTION

PATENT NO. : 5,655,015
DATED : August 5, 1997
INVENTOR(S) : Maryann P. Walsh and Paul M. Gasparro It is certified that error appears in the above-identified patent and that said Letters Patent is hereby corrected as shown below:

In the Legend [*] Notice:

Change "The term of this patent shall not extend beyond the expiration date of Pat. No. 5,637,917." to --The term of this patent shall not extend beyond the expiration date of Pat. No. 5,642,410.--.

Signed and Sealed this

Twenty-eighth Day of October, 1997

Attest:

BRUCE LEHMAN

Attesting Officer

Commissioner of Patents and Trademarks